(12) United States Patent
Rissone

(10) Patent No.: US 9,388,629 B2
(45) Date of Patent: *Jul. 12, 2016

(54) METHOD AND SYSTEM FOR SEALING AROUND DOOR

(76) Inventor: Robert Rissone, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/488,711

(22) Filed: Jun. 5, 2012

(65) Prior Publication Data

US 2012/0260580 A1 Oct. 18, 2012

Related U.S. Application Data

(63) Continuation of application No. 12/232,105, filed on Sep. 10, 2008, now Pat. No. 8,209,909.

(51) Int. Cl.
*E06B 7/16* (2006.01)
*E06B 7/23* (2006.01)

(52) U.S. Cl.
CPC ................................ *E06B 7/2312* (2013.01)

(58) Field of Classification Search
CPC .............. E06B 7/16; E06B 7/18; E06B 7/22; E06B 7/23; E06B 7/2312; E06B 7/2316
USPC ..................................... 49/482.1, 495.1, 475.1
See application file for complete search history.

(56) References Cited

U.S. PATENT DOCUMENTS

| | | | | |
|---|---|---|---|---|
| 399,413 | A | * | 3/1889 | Jones ............................ 49/482.1 |
| 1,783,305 | A | | 12/1930 | Axel |
| 1,883,609 | A | | 10/1932 | Dennis |
| 1,986,465 | A | * | 1/1935 | Dempsey ....................... 277/632 |
| 2,739,358 | A | | 3/1956 | Kunkel |
| 3,250,040 | A | * | 5/1966 | Squires ......................... 49/482.1 |
| 4,272,931 | A | * | 6/1981 | Stanizzo ............................ 52/98 |
| 4,528,775 | A | | 7/1985 | Einarsson |
| 4,742,646 | A | | 5/1988 | Kehrli |
| 5,010,691 | A | * | 4/1991 | Takahashi ..................... 49/482.1 |
| 5,203,130 | A | * | 4/1993 | Freelove ......................... 52/211 |
| 5,454,192 | A | * | 10/1995 | Adler et al. ..................... 49/307 |
| 5,496,605 | A | | 3/1996 | Augst et al. |
| 5,577,349 | A | * | 11/1996 | Rissone ....................... 49/495.1 |
| 5,653,072 | A | * | 8/1997 | Seelandt-Stasek et al. .. 52/204.1 |
| 5,769,562 | A | * | 6/1998 | Jones ................................. 404/7 |
| 6,058,654 | A | | 5/2000 | Rissone |
| 6,266,924 | B1 | | 7/2001 | Rissone |

(Continued)

OTHER PUBLICATIONS

U.S. Appl. No. 12/232,105, filed Sep. 10, 2008; Rissone.

(Continued)

*Primary Examiner* — Katherine Mitchell
*Assistant Examiner* — Abe Massad
(74) *Attorney, Agent, or Firm* — Nixon & Vanderhye P.C.

(57) ABSTRACT

Certain example embodiments relate to a sealing system for sealing the periphery of a door relative to a frame. The sealing system includes a multi point finger seal having at least three fingers of differing height and spacing so that a first finger may contact the door and contact of the first finger and second finger is precluded. A second finger is sized and spaced from a third finger so that a free edge of the second finger abuts the base of the third finger. A security seal is located at the bottom of the door and includes a security flap biased into the door, wherein a cam on the frame engages the flap upon closure of the door to urge the security flap toward the floor. The seal includes one or more perforations therein, causing the seal to breakaway and into pieces if removal is attempted.

7 Claims, 28 Drawing Sheets

(56) References Cited

U.S. PATENT DOCUMENTS

| | | | |
|---|---|---|---|
| 6,269,591 B1 * | 8/2001 | Kelly | 49/482.1 |
| 6,381,905 B1 | 5/2002 | Rissone | |
| 7,097,891 B2 * | 8/2006 | Fenelon | 428/40.1 |
| 7,335,412 B2 | 2/2008 | Wylie | |
| 7,448,173 B2 * | 11/2008 | Brisbois et al. | 52/202 |
| 7,788,852 B2 * | 9/2010 | Wexler et al. | 49/482.1 |
| 8,209,909 B2 * | 7/2012 | Rissone | 49/482.1 |
| 2003/0215165 A1 | 11/2003 | Hogan et al. | |
| 2004/0175527 A1 | 9/2004 | Shiota et al. | |
| 2008/0086952 A1 * | 4/2008 | Holwick | 52/3 |
| 2008/0196315 A1 * | 8/2008 | Brisbois et al. | 49/462 |
| 2010/0058670 A1 * | 3/2010 | Rissone | 49/495.1 |
| 2012/0260580 A1 * | 10/2012 | Rissone | 49/495.1 |

OTHER PUBLICATIONS

George F. Schrader, Ahmad K. Eishennawy, Lawrence E. Doyle, Manufacturing Processes and Materials, 2000, Societ of Manufacturing Engineers, pp. 135.

* cited by examiner

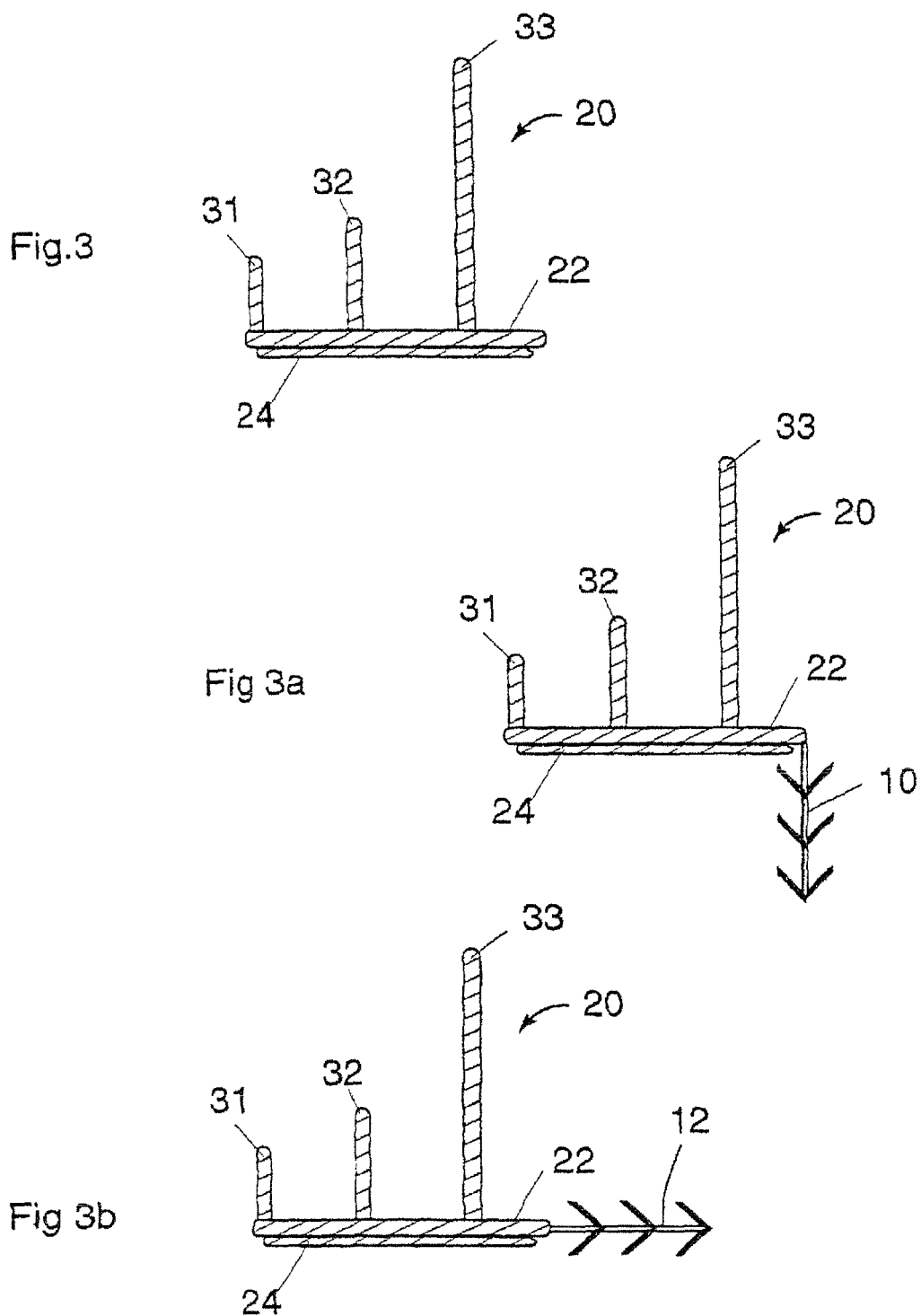

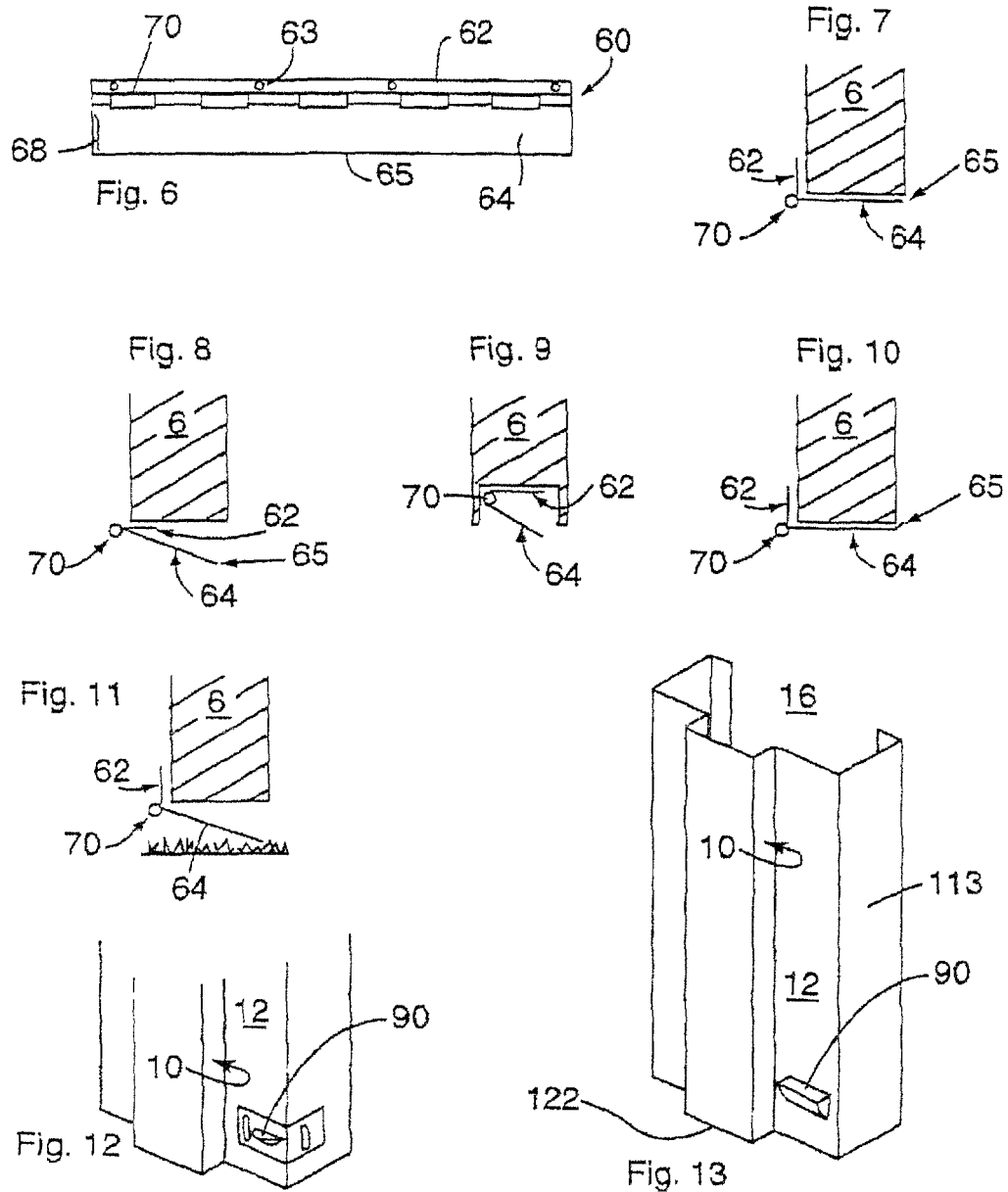

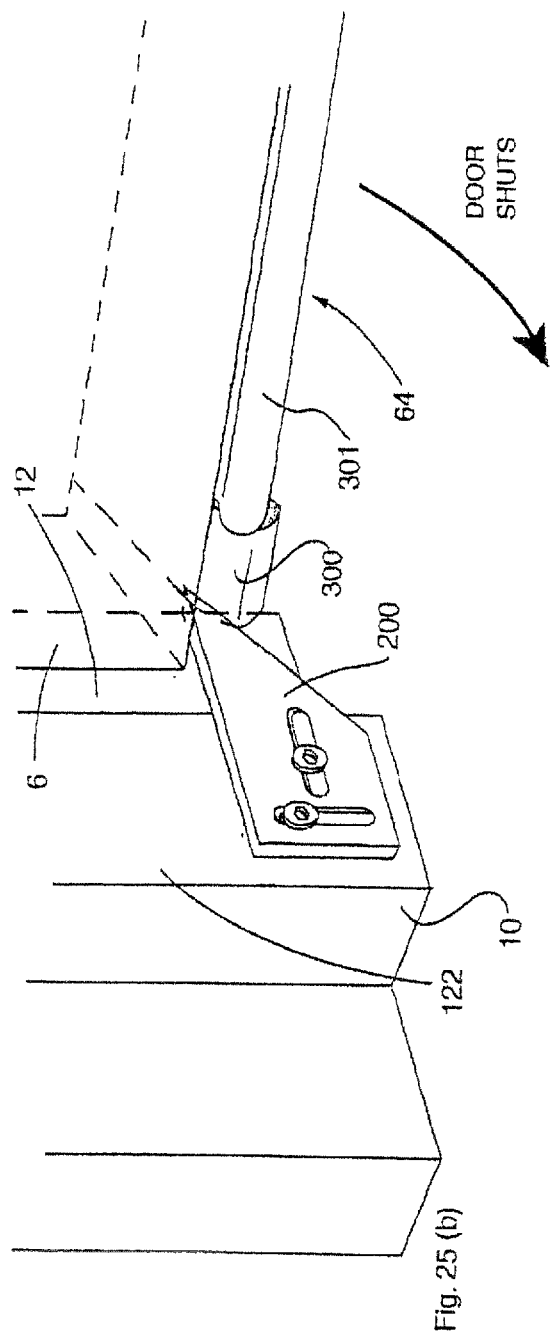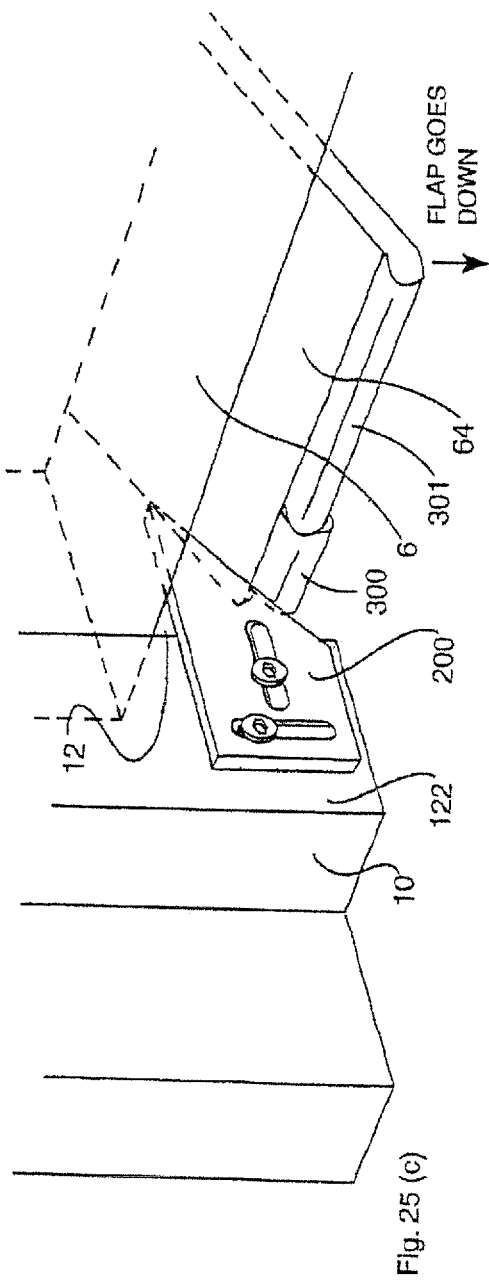

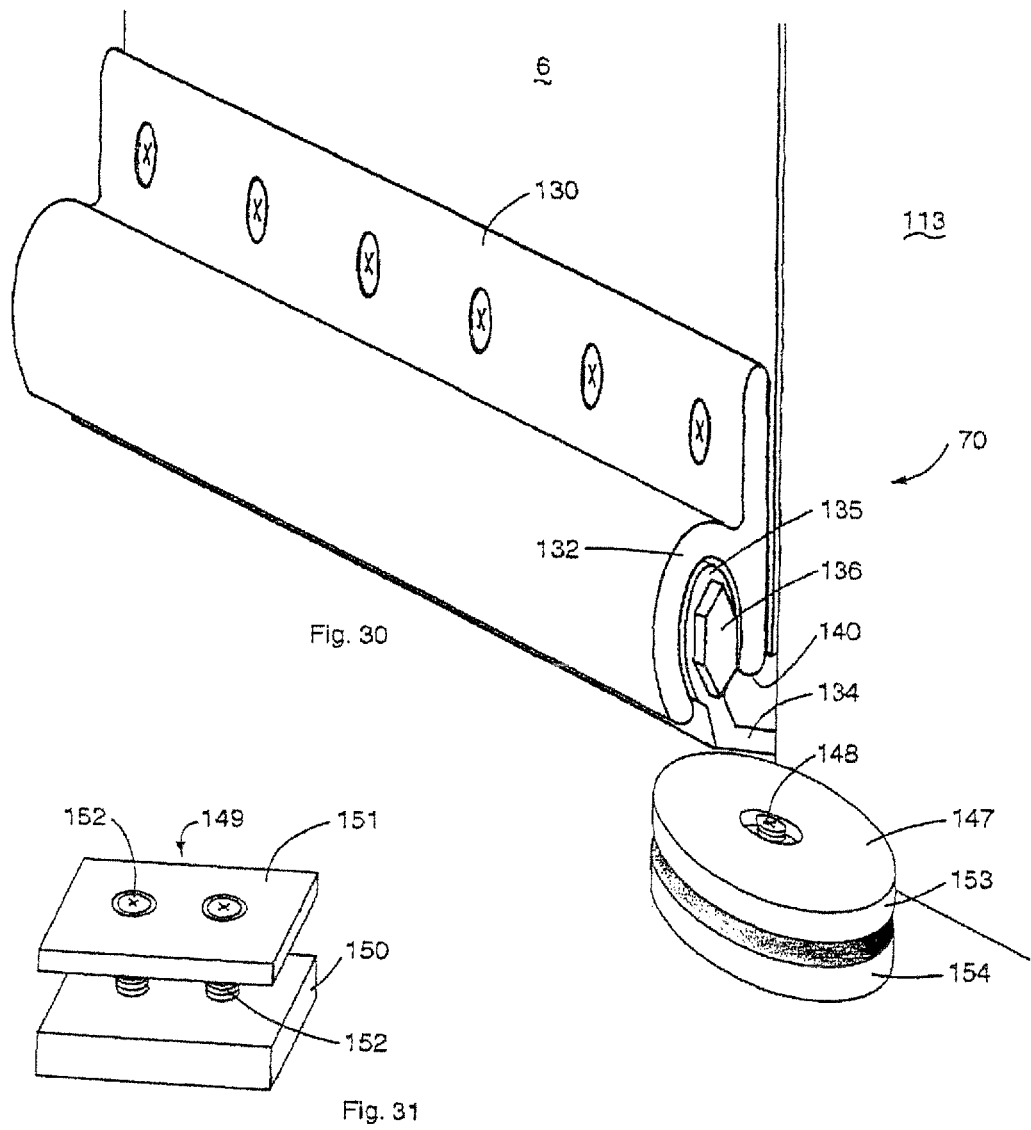

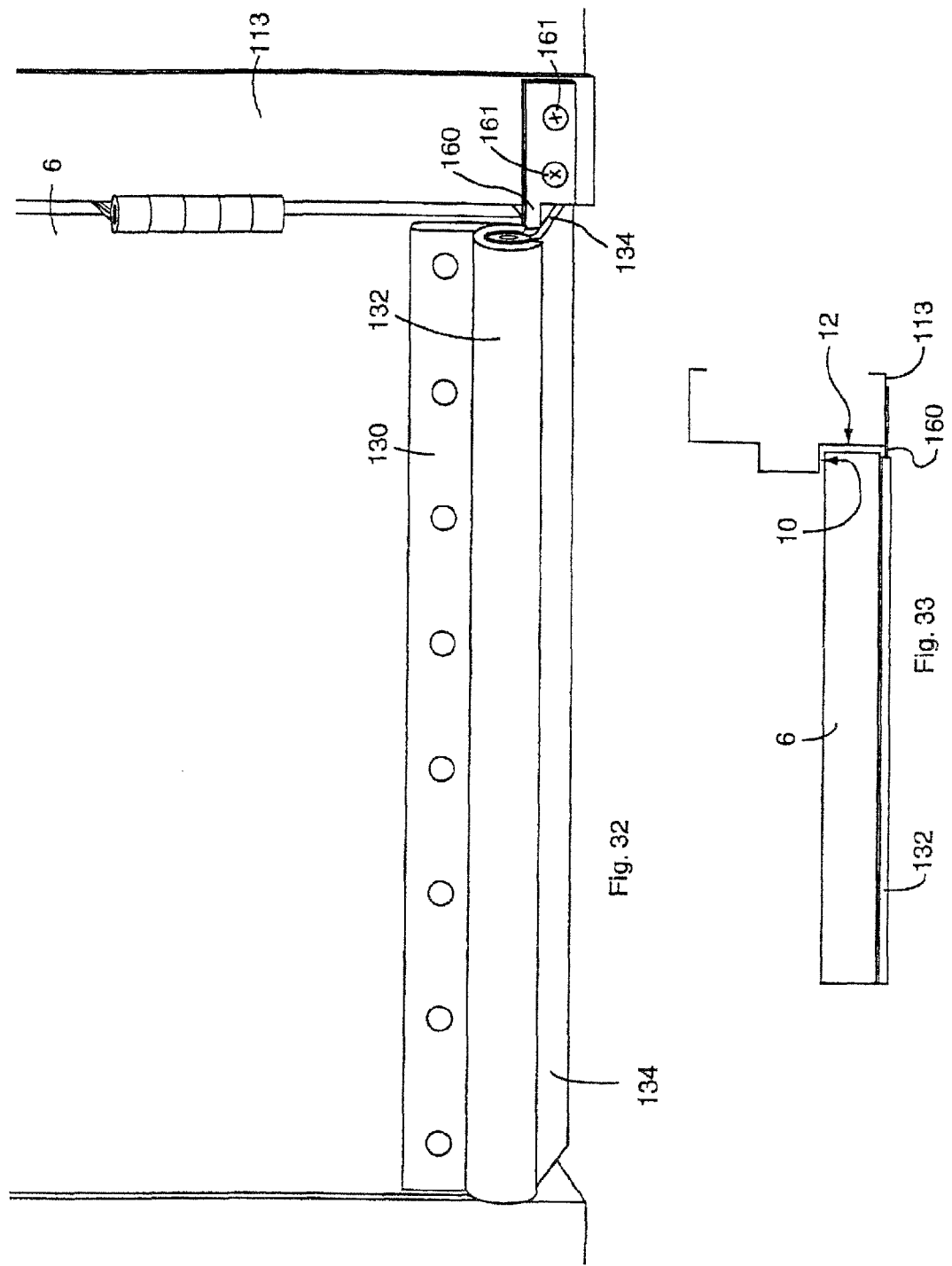

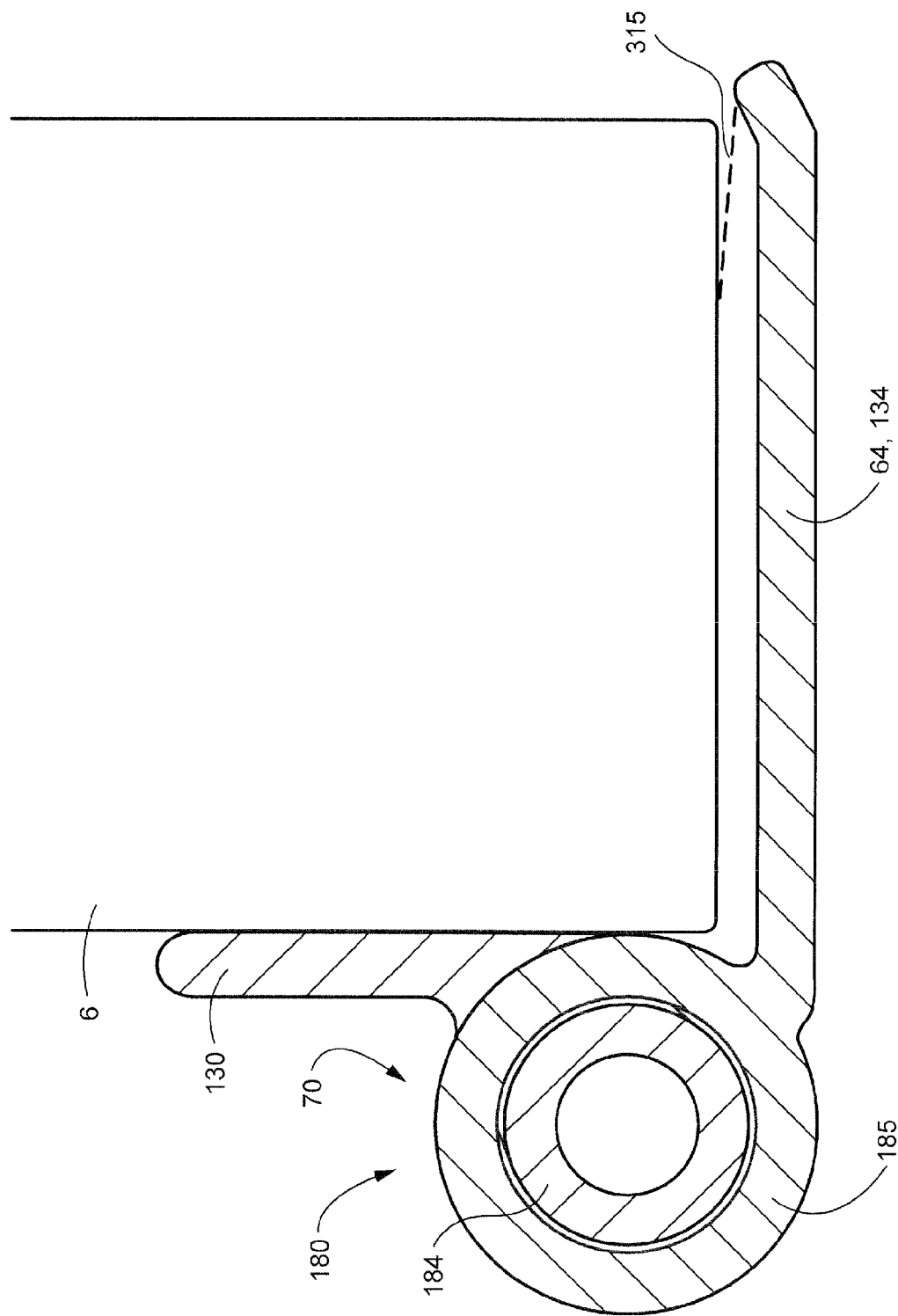

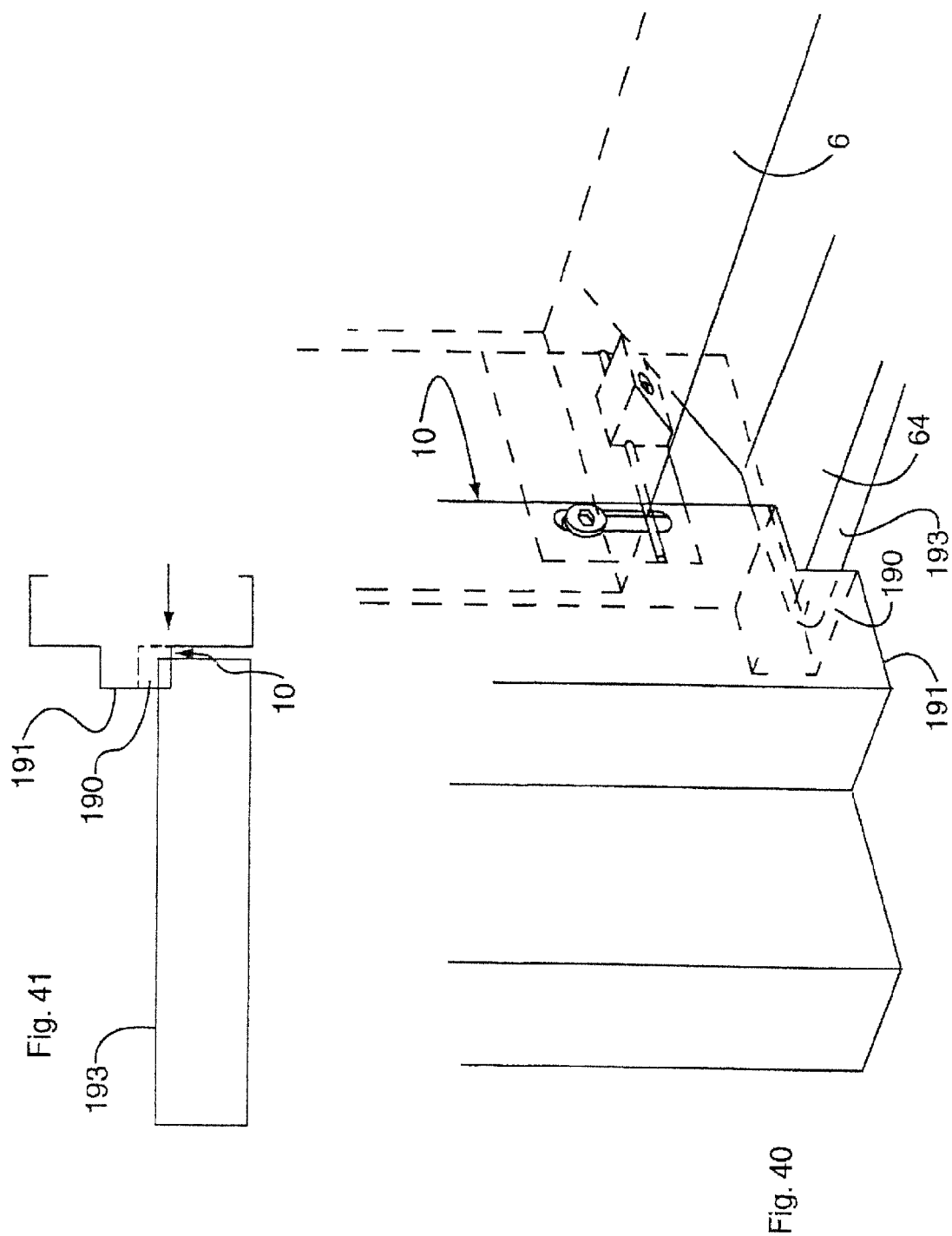

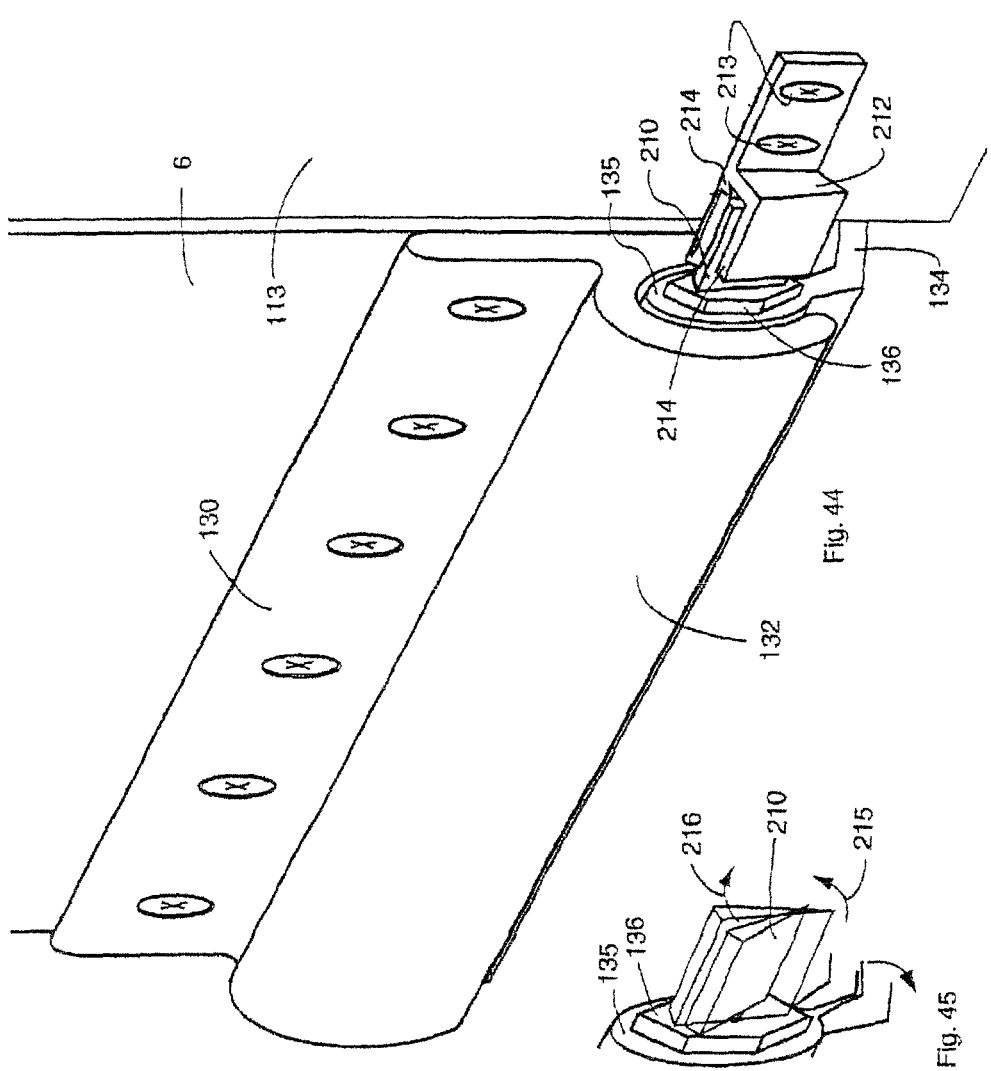

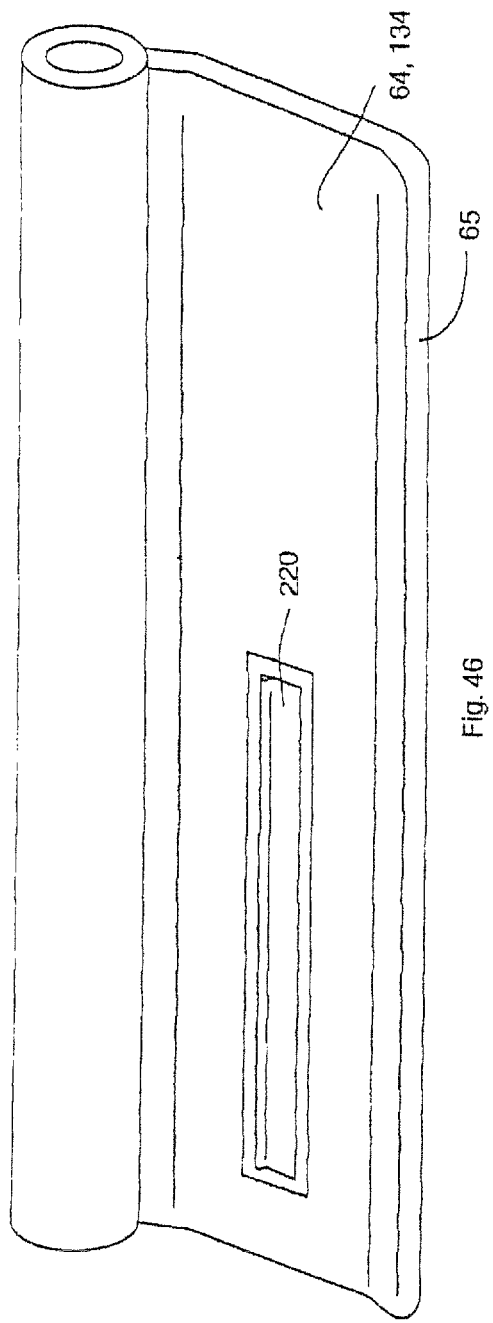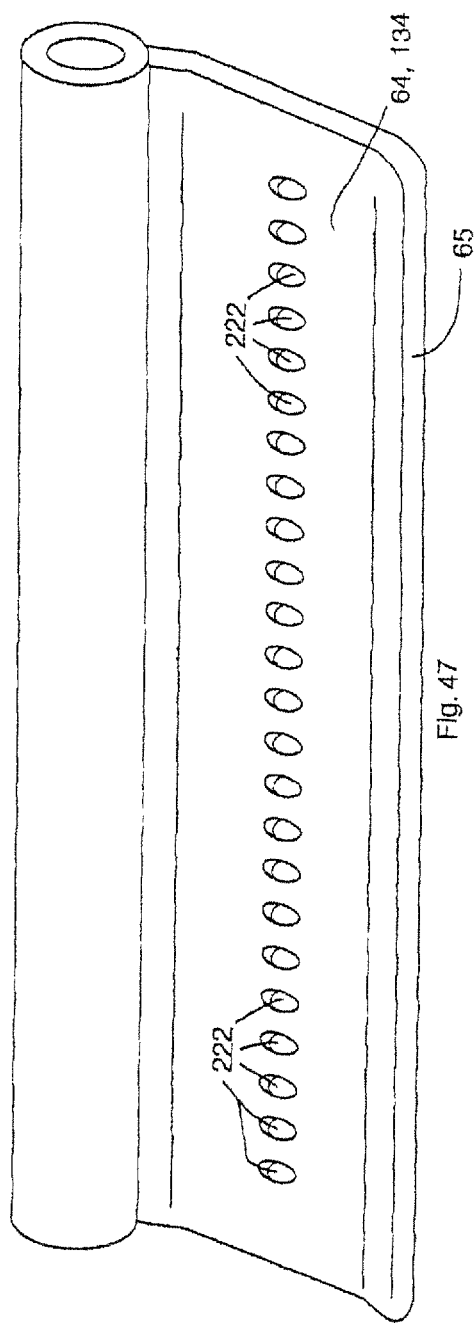

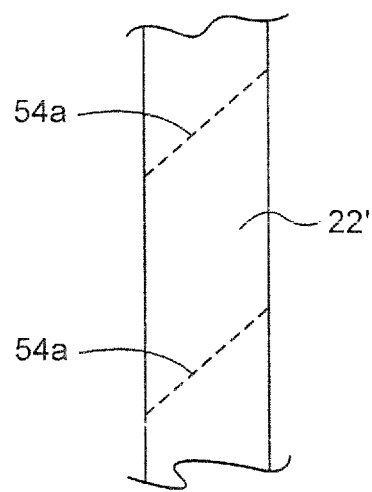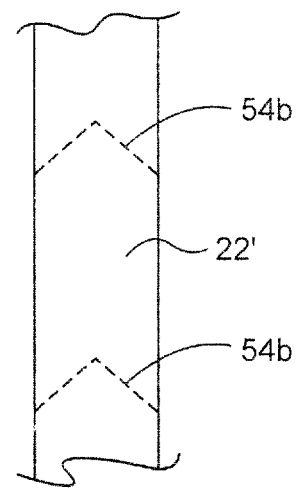
Fig. 56(a)   Fig. 56(b)
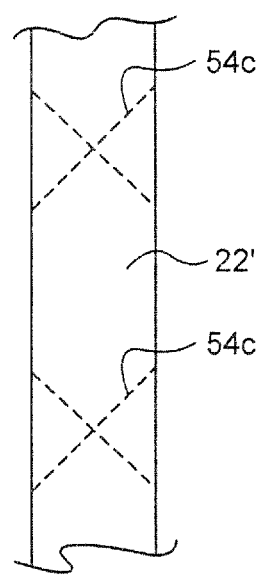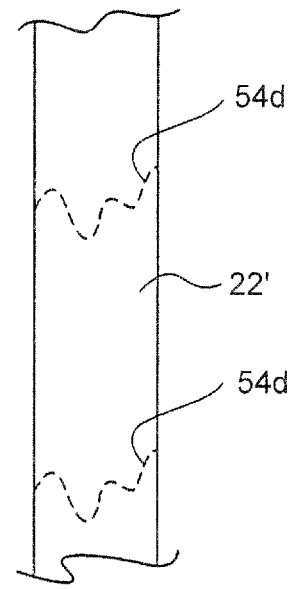
Fig. 56(c)   Fig. 56(d)

METHOD AND SYSTEM FOR SEALING AROUND DOOR

This application is a continuation of Ser. No. 12/232,105, filed Sep. 10, 2008 now U.S. Pat. No. 8,209,909, the entire content of which is hereby incorporated by reference in this application.

CROSS REFERENCE TO APPLICATIONS

This application hereby incorporates by reference each of U.S. Pat. Nos. 6,381,905; 6,266,924; 6,058,654; and 5,577,349.

FIELD OF THE INVENTION

Certain example embodiments of this invention relate to sealing systems and, more particularly, to a method and apparatus for sealing a door relative to an adjacent frame with a multi-finger seal and a rigid mechanical security seal. The security seal includes one or more perforations therein that cause the seal to breakaway and into pieces if removal is attempted.

BACKGROUND AND SUMMARY OF EXAMPLE EMBODIMENTS OF THE INVENTION

The sealing of doors to separate the inside from the outside, or a secure area from a public area is an interface which must accommodate a wide variety of demands. That is, the interface must provide sufficient security as well as permit access to individuals including handicapped. For example, as door levers are being mandated by current building codes, the use of door knobs has significantly decreased. The door handle includes a lever on both sides of the door. The latch mechanism is released by turning the handle with a force which is not to exceed a predetermined limit. Many building codes also require deadbolts for securing the door. However, the codes usually require the latch and deadbolts to be retracted simultaneously upon the single actuation of the inside handle for emergency egress. Therefore, unintended entry may be gained by bending a stiff wire, sliding it under the door and angling it back to the face of the door to loop on the lever and pulling the lever down. As the deadbolt is automatically released when the inside lever is actuated, this actuation of the inside lever substantially reduces the security provided by the deadbolt. Door guards and door chains do not add security when a person leaves a room, as these devices may be only actuated by someone inside the room. Further, once the inside handle and deadbolt are released, the remaining security devices may not provide the most sufficient security.

Further, the National Life Safety Code, State Codes, Model Building Codes, require that openings such as room entries in dormitories, hotel and motel rooms and offices from corridors must be sealed to prevent the passage of toxic gas and/or smoke and may also include a fire resistive rating. Codes also reference "Listed Authorities" for clarification of Nationally Recognized Standards such as NFPA (National Fire Protection Association) NFPA 105 for setting limits of smoke infiltration. Even if the door frame is sufficiently sealed, a sufficiently large gap at the bottom of the door may substantially defeat a frame seal. Further, many of these doors must be self closing and self latching. However, anything which rides on or rubs against a rug or floor may interfere with the self closing and latching, thereby violating the codes. While thresholds are used to seal the gap with the bottom of the door, the thresholds often present a trip hazard and may be so high as to violate handicap codes. Further, the presence of gaps between door and floor or even frame, allow penetration of noise, smoke, odor, light, and contribute to noise penetration.

A current problem in the marketplace exists with respect to the ability to use existing seals to harm persons. For example, people have pulled gasketing material off of door frames in prisons, psychiatric facilities, halfway houses, and other locations, and have used the same to strangle or hang themselves and/or others. This very real threat has led at least the State of New York to pass regulations relating to the length of strips of gasketing material that may be used to do harm.

In view of the above, it is apparent that there exists a need in the art for both an improved security seal for affixation at or below a door and an improved multi-finger door frame seal for affixation in a door frame surrounding the door, the overall door sealing system for improving performance with respect to fire codes, heating/ventilating codes, and industry self-policing codes (e.g., ASTM, NFPA, and/or ANSI codes). Also, such smoke seals should function to prevent fire-fueling oxygen from entering such rooms, while also reducing the ability to use existing seals to harm persons, e.g., by strangulation, hanging, etc.

In certain example embodiments of this invention, a multi-finger seal system sealing between a door and surrounding frame is provided. The frame includes a stop and a rabbet surrounding strike and hinge sides of the door. A first multi-finger seal portion is provided, at least a portion of which is disposed on a lock jamb adjacent the strike side of the door, with the first seal portion including a base affixed upon the rabbet on the lock jamb and a plurality of flexible fingers extending therefrom. The fingers include first, second, and third fingers extending from the base. The first finger has a length less than the second and third fingers, and the third finger has a length greater than the first and second fingers. The third finger is located closest to the stop on the lock jamb and the first finger is disposed farthest from the stop so that the first finger is first contacted and bent by the door toward the second finger when the door is being closed. A second multi-finger seal portion is disposed on a hinge jamb adjacent the hinge side of the door. The second seal portion includes a base attached upon the stop of the hinge jamb so that the base of the second seal portion is arranged substantially perpendicular to the base of the first seal portion. The second seal portion further includes first, second, and third flexible fingers extending from the second seal portion base with the first finger of the second seal portion being the shortest of the three and located farthest from the rabbet of the hinge jamb and the third finger of the second seal portion being the longest of the three and located on the stop closest to the rabbet of the hinge jamb so that the hinge side of the door first contacts and bends the first finger of the second seal portion toward the second finger of the second seal portion when the door is being closed. A plurality of perforations are located at predetermined intervals along the first and second multi-finger seal portions. The perforations are funned such that the multi-finger seal system breaks away and into pieces proximate to where the perforations are located should removal of the multi-finger seal system from the frame of the door be attempted.

In certain example embodiments, a multi-finger seal for sealing between a door and surrounding frame is provided. A base is provided for mounting on one of a stop and rabbet of the surrounding frame. First, second, and third flexible sealing fingers protrude outwardly from the base. The second finger is located immediately between the first and third fingers with the first finger having the smallest length and the third finger having the greatest length. The first finger is located relative to the door so that it is first contacted and bent by the door toward the second finger when the door is closing. The first finger has a length sufficiently small so that when contacted and bent by the closing door the bent first finger does not overlap the second finger. A plurality of perforations are located at predetermined intervals along the base and the first, second, and third flexible sealing fingers. The perforations are formed such that the multi-finger seal system breaks away and into pieces proximate to where the perforations are located should removal of the multi-finger seal system be attempted.

In certain example embodiments, a method of making a multi-finger seal for sealing between a door and surrounding frame is provided. A base is provided for mounting on one of a stop and rabbet of the surrounding frame. First, second, and third flexible sealing fingers are provided, which each protrude outwardly from the base. The second finger is located immediately between the first and third fingers with the first finger having the smallest length and the third finger having the greatest length. The first finger is located relative to the door so that it is first contacted and bent by the door toward the second finger when the door is closing. The first finger has a length sufficiently small so that when contacted and bent by the closing door the bent first finger does not overlap the second finger. A plurality of perforations are formed at predetermined intervals along the base and the first, second, and third flexible sealing fingers. The perforations are formed such that the multi-finger seal system breaks away and into pieces proximate to where the perforations are located should removal of the multi-finger seal system be attempted.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which:

FIG. 3 is a side elevational cross-sectional view of a multi-finger frame seal similar to that shown in FIG. 1 except that it only includes three flexible fingers.

FIG. 3(a) is a side elevational cross-sectional view of the multi-finger frame seal of FIG. 3 except that a kerf engaging tab for mounting on the hinge jamb is also provided.

FIG. 3(b) is a side elevational cross-sectional view of the three finger seal of FIG. 3 except that a kerf engaging tab for affixing the seal on the lock jamb is also provided.

FIG. 6 is an elevational view of a spring-biased security seal for affixation to the bottom of a door.

FIG. 7 is a side elevational cross-sectional view illustrating the security seal of FIG. 6 affixed adjacent the bottom of a door.

FIG. 8 is a side elevational cross-sectional view illustrating the security seal of FIG. 6 attached to the bottom of a door so that its door engaging portion is attached to the underneath or bottom side as opposed to the embodiment shown in FIG. 7 where the door engaging portion is affixed to the interior face of the door.

FIG. 9 is a side elevational cross-sectional view illustrating the security seal of FIG. 6 affixed adjacent the bottom of a door in a recess defined therein, FIGS. 8 and 9 illustrating the seal when the door is in the closed position.

FIG. 10 is a side elevational cross-sectional view of the security seal of FIG. 6 including an angled distal end so as to achieve easy sliding of the security flap across rugs and the like.

FIG. 11 is a side elevational cross-sectional view of the security seal of FIGS. 6-7 contacting the floor when the door is in the closed position.

FIG. 12 is a perspective view illustrating an actuating cam and corresponding bracket affixed to the door frame for use in conjunction with a spring-biased security seal (e.g., FIG. 6).

FIG. 13 is a perspective view illustrating another type of security seal actuating cam affixed to the door frame.

FIG. 30 is a perspective view of yet another gravity-actuated security seal according to an embodiment of this invention.

FIG. 31 is a perspective view of another actuator which may be used in conjunction with the gravity-actuated security seal of FIG. 30.

FIG. 32 is a perspective view illustrating a flap locking member mounted on the door frame which may be used in conjunction with any of the security seals discussed above.

FIG. 33 is a top elevational view illustrating the door, frame, and flap locking member of FIG. 32.

FIG. 37 is a side elevational cross-sectional view of a security seal having a hinge according to another embodiment of this invention.

FIG. 40 is a perspective view of an embodiment similar to that of FIGS. 38-39 except that the recess is designed differently so that it is formed in both the soffit and the stop surfaces.

FIG. 41 is a top elevational view of the system of FIG. 40 illustrating the security flap with its distal end tucked into the recess in the stop/soffit as shown in FIG. 40.

FIG. 44 is a perspective view illustrating a security seal according to another embodiment of this invention.

FIG. 45 is a schematic diagram illustrating rotation of the projection extending from the end of the flap in FIG. 44 during opening/closing of the door.

FIGS. 46-47 are perspective views illustrating security flaps for improved make-up air circulation according to different embodiments of this invention.

FIGS. 56(a) to 56(d) show various example perforation configurations according to different embodiments of this invention.

DETAILED DESCRIPTION OF EXAMPLE EMBODIMENTS OF THE INVENTION

Figure 1:
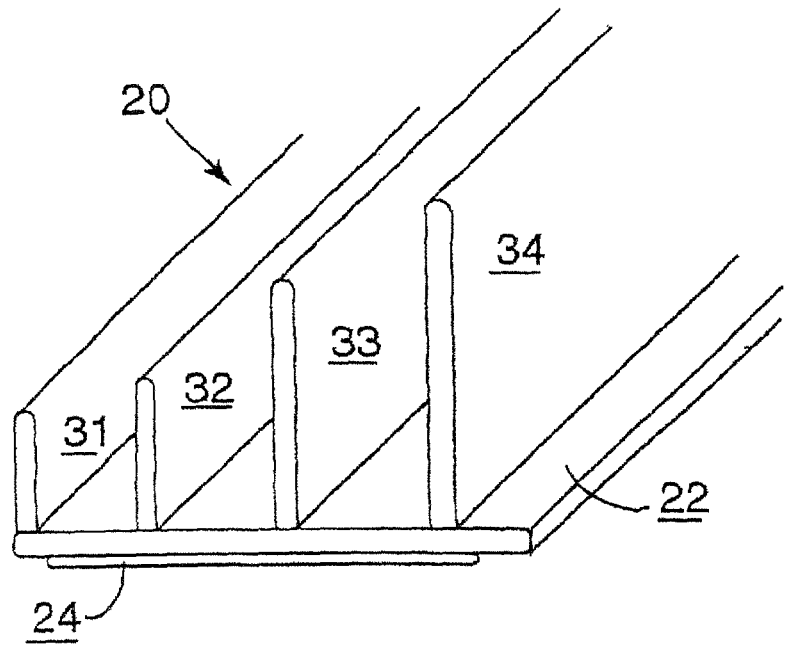
FIG. 1 is a perspective view of a multi-finger frame seal for affixation to a door frame surrounding a door.

Referring now more particularly to the following drawings in which like reference numerals indicate like parts throughout the several views.

FIG. 1 is a perspective view of multi-finger frame seal 20 which includes substantially planar elongated base 22, as well as a plurality of flexible, fingers 31, 32, 33, and 34 mounted on and extending therefrom. As shown, first finger 31 is shorter than second finger 32 which is shorter than third finger 33, which in turn has a shorter length from base 22 than fourth finger 34. Pressure sensitive tape or adhesive 24 may be applied to the under or rear side of base 22 for the purpose of affixing multi-finger seal 20 to a door frame. When frame seal 20 is affixed to a door frame adjacent a door, it is oriented so that when the door is closed, the door first comes into contact with first finger 31 and thereafter contacts fingers 32, 33, and 34, respectively.

Figure 2:
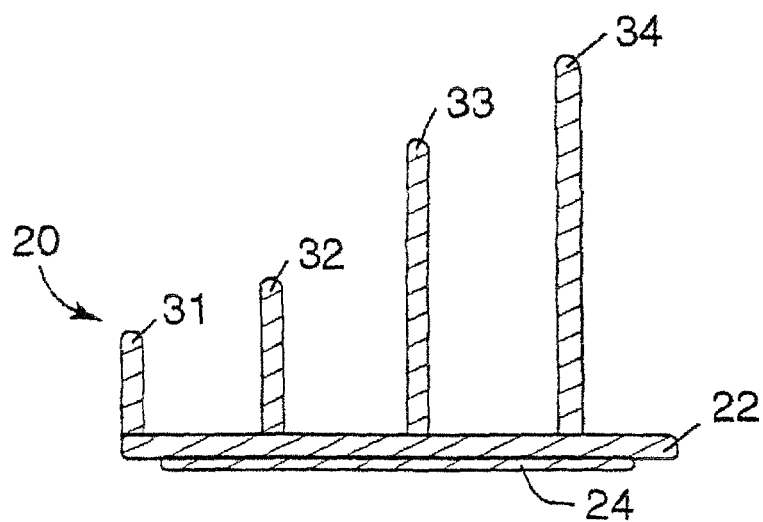
FIG. 2 is a side elevational cross-sectional view of the multi-finger frame seal of FIG. 1, this figure illustrating four separate flexible fingers attached to the base portion.

FIG. 2 is a side elevational cross-sectional view of multi-finger frame seal 20. As illustrated, the distance between first finger 31 and second finger 32 is such that upon bending of finger 31 as caused by closure of a door, first finger 31 does not contact any portion of second finger 32. Second, third, and fourth fingers 32-34, respectively, are spaced from one another along base 22 such that when the door closes, they will contact one another. Base 22, as well as the fingers of frame seal 20, may be formed of a material such as Santoprene™. Further description of frame seal 20 may be found in commonly owned U.S. Pat. No. 5,577,349, the disclosure of which is incorporated herein by reference.

Figure 2A:
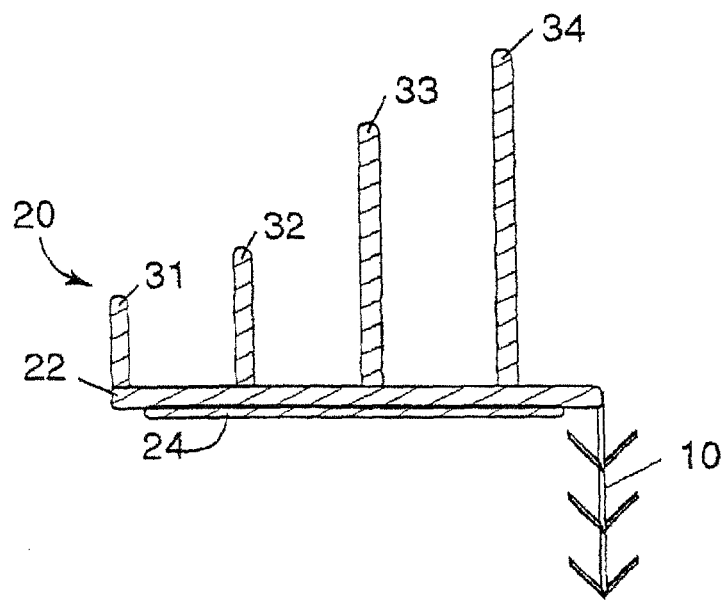
FIG. 2(a) is a side elevational cross-sectional view of the multi-finger frame seal of FIGS. 1-2, except that a kerf engaging tab for affixing the seal on the hinge jamb is provided.

FIG. 2(a) is a side cross-sectional view of frame 20 which differs from FIGS. 1-2 in that kerf 10 is attached or affixed to an edge of base 22 so that seal 20 may be attached to the door frame hinge jamb. Kerf 10 is designed so as to fit into an aperture defined in the jamb so as to more securely affix seal 20 to the door frame along the hinge jamb.

Figure 2B:
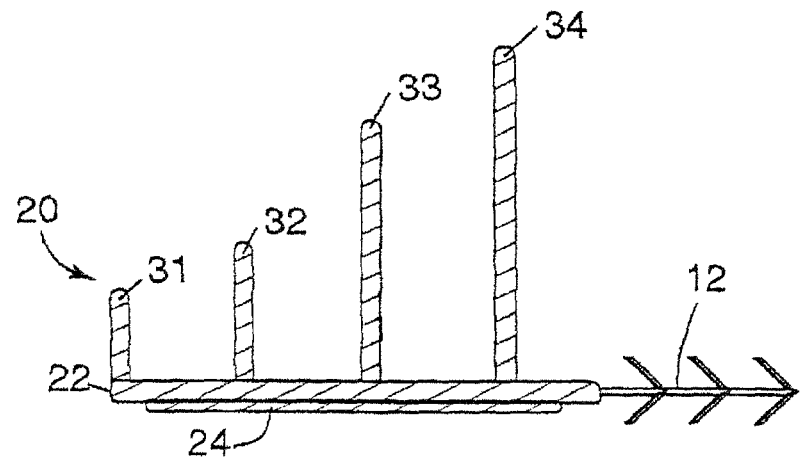
FIG. 2(b) is a side elevational cross-sectional view of the multi-finger frame seal of FIGS. 1-2, except that a kerf engaging tab for mounting on the lock jamb is also provided.

FIG. 2(b) is a side cross-sectional view of multi-finger frame seal 20 which differs from the FIGS. 1-2 embodiment in that kerf engaging tab 12 is affixed to base 22 at an edge thereof for the purpose of securing seal 20 to the door frame lock jamb. In FIG. 2(b), kerf 12 is substantially coplanar with base 22 because base 22 on the lock jamb is to be secured to the rabbett. This configuration differs from FIG. 2(a) where kerf 10 is substantially perpendicular to base 22 because on the hinge jamb, base 22 is to be affixed to the stop.

FIG. 3 is a side cross-sectional view of another multi-finger frame seal 20 which differs from the FIGS. 1-2 embodiment in that only three flexible fingers 31-33 are provided on base 22. FIGS. 3(a) and 3(b) are side cross-sectional views of a three finger seal 20 having kerfs 10 and 12, respectively, in a manner similar to that discussed above with respect to FIGS. 2(a) and 2(b). The three fingers 31-33 of the frame seals shown in FIGS. 3-3(b) are provided on base 22 so that when the door closes, first finger 31 will not contact finger 32, but finger 32 will contact finger 33.

Figure 4:
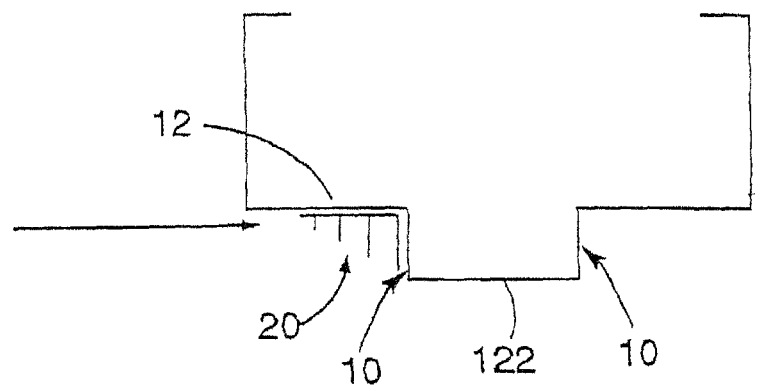
FIG. 4 is a top plan view illustrating the multi-finger frame seal of FIG. 1, 2, or 3 affixed to the lock jamb of the door frame.
Figure 5:
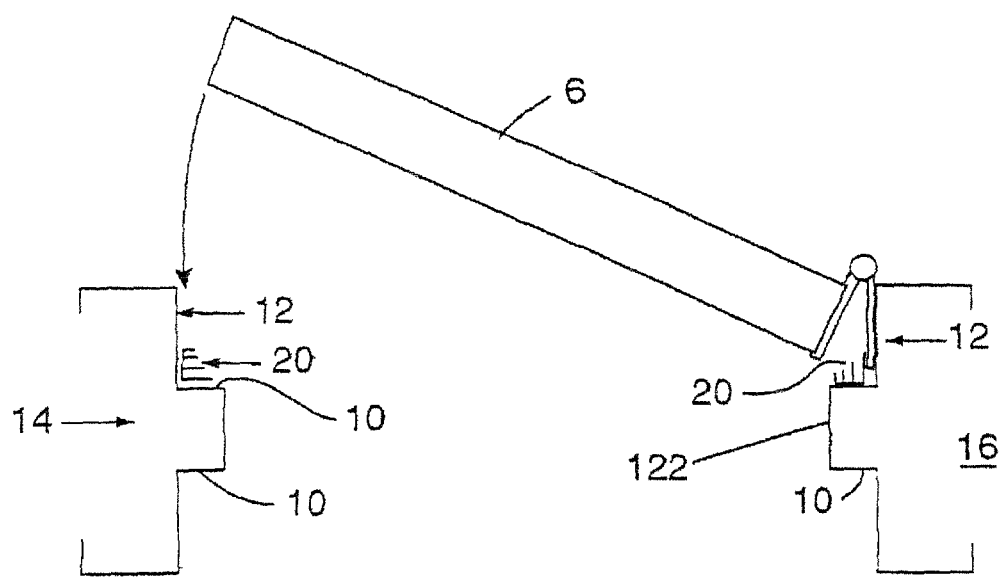
FIG. 5 is a top plan view illustrating the operable orientation of the multi-finger seal of either FIG. 1, 2, or 3 on both the lock and hinge jambs of the frame surrounding the door, the door being shown closing by way of an arrow.

FIG. 5 is a top view illustrating any of the above frame seals 20 attached to the door frame surrounding door 6. The door frame surrounding door 6 includes vertically extending lock jamb 14 and hinge jamb 16 which are attached at their respective tops by a header. On lock jamb 14, multi-finger seal 20 is affixed on rabbett 12 so that the fingers of seal 20 extend toward hinge jamb 16 when door 6 is in an open position. When door 6 closes as illustrated in FIG. 5, the door first comes into contact with first finger 31, and thereafter fingers 32, 33, and 34, respectively. FIG. 4 is a top view illustrating seal 20 affixed to lock jamb 14 in an enlarged manner.

Meanwhile, on the hinge jamb 16 side, multi-finger frame seal 20 has its base 22 attached to stop 10 so that as door 8 closes, it first contacts first finger 31 and thereafter the remaining fingers in the same order as occurs on the lock jamb side. Thus, frame seal 20 is oriented differently on the lock and hinge jambs. Seal 20 is affixed to the rabbett on the lock jamb side and to the stop surface 10 closest the door on the hinge jamb 16 side. This provides for substantially no hinge bind during closing of the door. Additionally, the multi-finger seals 20 on the hinge and lock sides of the door frame may be part of a single integrally formed seal 20 which is U-shaped, the vertically extending hinge and lock jamb portions shown in FIG. 5 being interconnect across the top of the door frame by another multi-finger seal portion.

Figure 48:
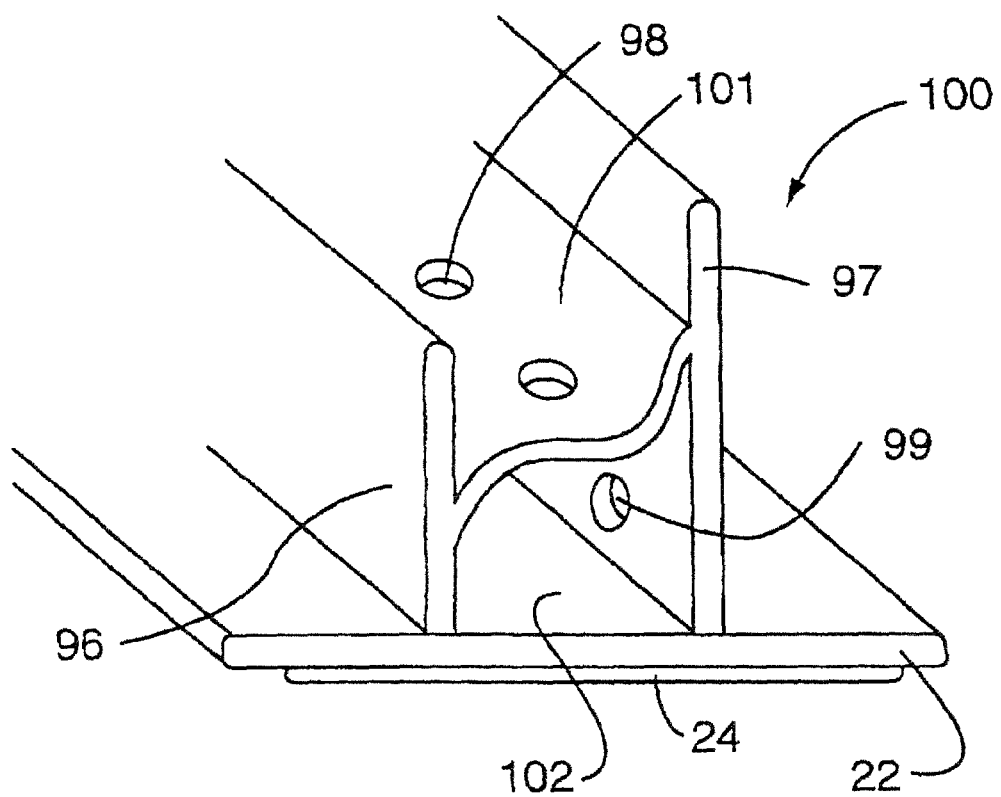
FIG. 48 is a perspective view illustrating a multi-finger frame seal according to a different embodiment of this invention.
Figure 49:
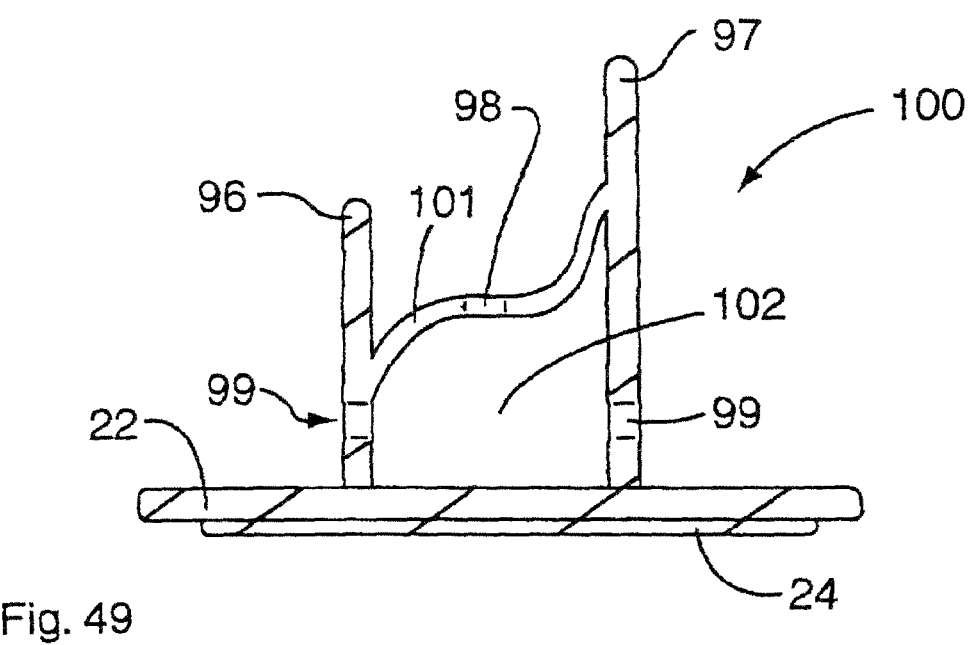
FIG. 49 is a side elevational cross-sectional view of the FIG. 48 frame seal.

FIGS. 48-49 illustrate perspective and side cross-sectional views respectively of a two finger frame seal 100 according to an embodiment of this invention. Frame seal 100 is to be affixed to the door frame as shown in FIG. 5 (e.g., similar to frame seal 20). Frame seal 100 differs from seal 20 in that i) seal 100 has only two fingers; and ii) seal 100 includes bridge 101 disposed between and connecting flexible fingers 96 and 97 for the purpose of creating an air cushion seal. Bridge 101 is spaced from base 22 thereby defining elongated air gap or opening 102 therebetween. Gap 102 extends along the entire length of base 22 in between fingers 96 and 97 as defined by flexible bridge 101. The provision of bridge 101 with its air relief apertures 98 defined therein allows seal 100 to function as an air cushion when door 6 is closed. Apertures 98 in bridge and aperture(s) 99 in the flexible fingers extending from base 22 allow seal 100 to function as an air cushion against shutting door 6 whereby the fluid (e.g., air or gas) within space 102 is forced out of the space 102 at a predetermined rate. The rate at which the fluid (e.g., air) is forced from space 102 is dictated by the number and size of apertures (98, 99). Accordingly, when door 6 closes, it first contacts finger 96 and forces it toward finger 97 thereby compressing space 102. The air within space 102 cushions the door while the air is expounded from the space through the apertures 98, 99, thereby resulting in a smoother closing of door 6. According to certain other embodiments of this invention, apertures 98, 99 need not be provided as the fluid such as air within space 102 may be forced from the space at an end or ends of the seal. It is noted that bridge 101 could also be implemented into three or four finger frame seal 20, with the bridge being disposed between either all fingers or only a select pair of flexible fingers.

The FIGS. 48-49 embodiment also shows that frame seals according to examples of this invention may include just two fingers, instead of three or four. The two finger seal of this embodiment does not create a predetermined sound upon opening of door 6. The sound created upon opening of door 6 depends upon the height and spacing of the fingers. For example, the sound would be enabled if a small third fin or finger were to be added to the FIGS. 48-49 frame seal.

Figure 54:
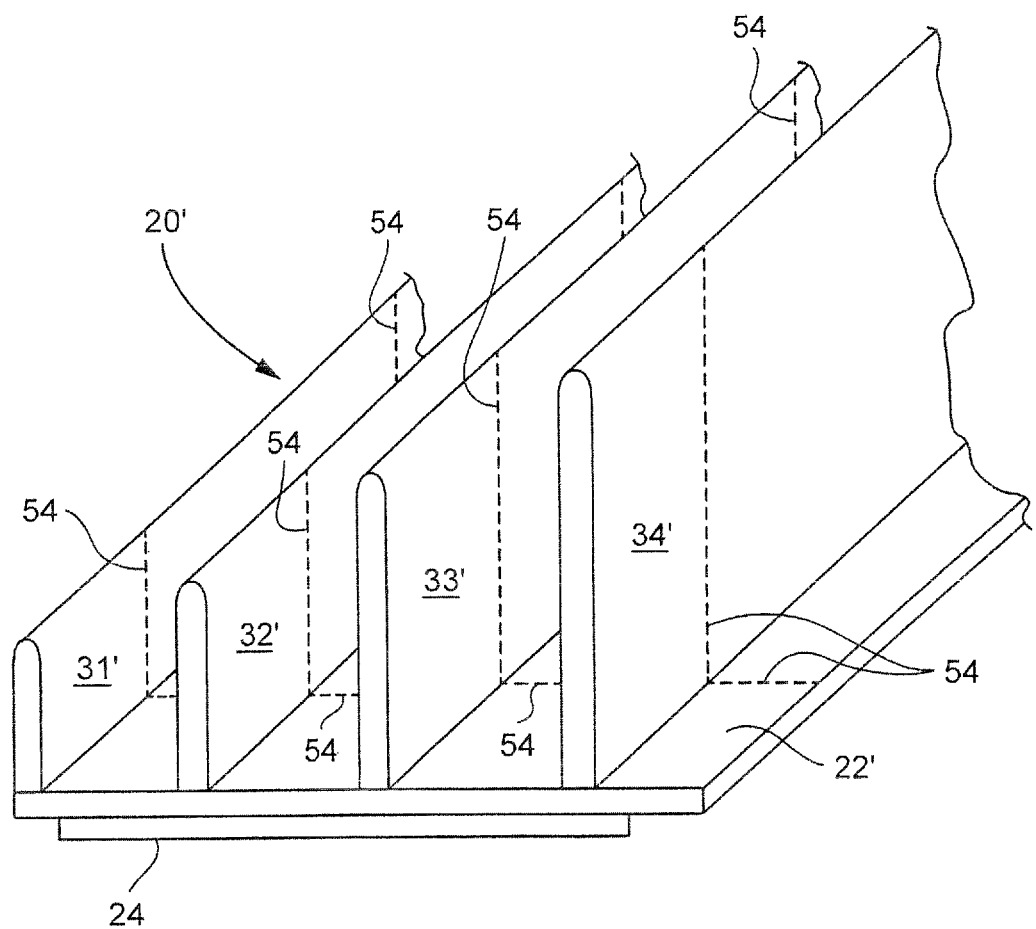
FIG. 54 is a perspective view of a multi-finger frame seal for affixation to a door frame surrounding a door that includes perforations, according to an example embodiment of this invention.

FIG. 54 is a perspective view of a multi-finger frame seal for affixation to a door frame surrounding a door that includes perforations, according to an example embodiment of this invention. FIG. 54 is similar to FIG. 1, except that the multi-finger seal 20' includes one or more perforations 54 that facilitate the breaking of the seal 20' in the event that it is moved. Thus, the multi-finger frame seal 20' of FIG. 54 includes substantially planar elongated base 22', as well as a plurality of flexible fingers 31', 32', 33', and 34' mounted on and extending therefrom, as well as perforations 54 provided to each of the flexible fingers 31', 32', 33' and 34'. As shown, first finger 31' is shorter than second finger 32' which is shorter than third finger 33', which in turn has a shorter length from base 22' than fourth finger 34'. Pressure sensitive tape or adhesive 24 may be applied to the under or rear side of base 22' for the purpose of affixing multi-finger seal 20' to a door frame. When frame seal 20' is affixed to a door frame adjacent a door, it is oriented so that when the door is closed, the door first comes into contact with first finger 31' and thereafter contacts fingers 32', 33', and 34', respectively.

The perforations 54 may be a series of holes, slits, thinned-out portions, and/or the like. Such perforations may be through-holes that extend through the material and/or recessions in the materials. The seal 20' will break at the perforated areas upon the application of less force than that required to break the non-perforated areas of the seal 20'. For example, the seal 20' will break at the perforated areas upon the application of about 20% less force, more preferably about 33% less force, and more preferably about 50% less force, than that required to break the non-perforated areas of the seal 20'. Of course, other percentages higher, lower, or in between such ranges also may be used in connection with certain example embodiments.

The perforations may be formed in the base material 22' and/or the fins or fingers 31', 32', 33' and 34'. Furthermore, the perforations may be formed in all such areas at one time in a single pass, or in multiple passes. In the latter case, for example, perforations could be formed in base material first and then in fins together or separately, or in some other order.

Figure 55:
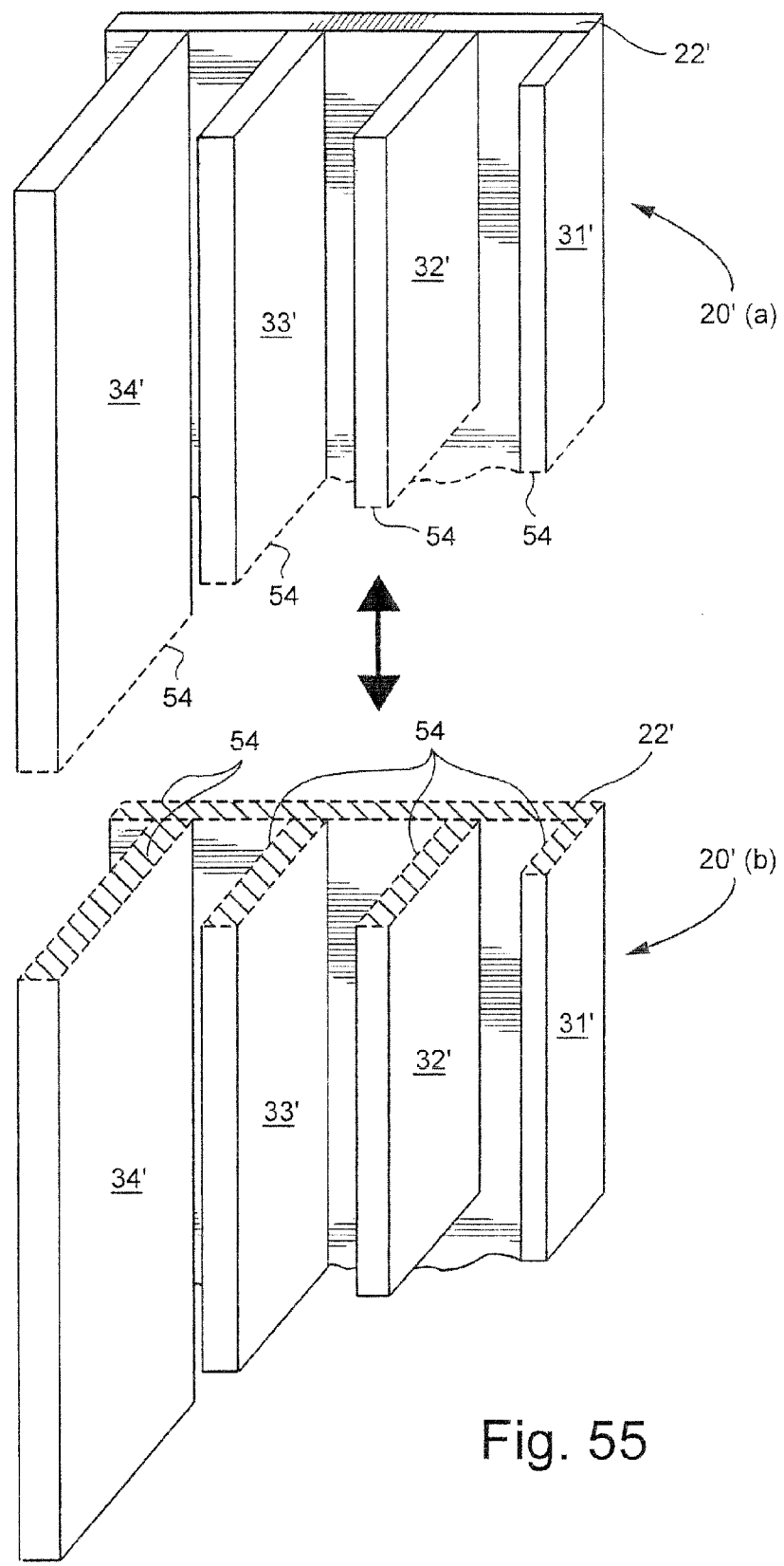
FIG. 55 is a view of the multi-finger frame seal of FIG. 54 having been broken apart at a perforation thereof, according to an example embodiment of this invention.

If someone should try to remove the frame seal 20' once it has been installed on a door frame, the seal 20' is designed to breakaway at least at the perforations 54. Thus, for example, FIG. 55 is a view of the multi-finger frame seal of FIG. 54 having been broken apart at a perforation thereof, according to an example embodiment of this invention. Because the frame seal 20' is broken into at least first and second frame seal pieces 20'(a) and 20'(b) that are small in length, the likelihood that the smaller pieces could be used for strangulation and/or hanging is thereby reduced. Indeed, the frame seal 20' thus includes anti-ligature gasketing. Even in the event that the seal 20' does not completely separate as it is being removed from the door frame, the perforations 54 formed therein may sufficiently weaken the seal 20' such that it ultimately breaks when the weight of a person trying to hang him- or herself is applied to it, and/or when it is being used to attempt to strangle another.

The perforations 54 in the seal 20' may be evenly or unevenly spaced apart. For example, perforations may be evenly spaced at about 2" to 8" intervals, or larger or smaller intervals. It is noted that longer intervals may be disadvantageous in some cases, as such longer pieces could be taken and mounted back-to-back (e.g., at every two inches) to re-create a device suitable for hanging and/or strangulation.

The perforations 54 described above and shown in FIGS. 54-55 are "straight line" perforations. That is, they extend substantially across/through the base 22' and/or the fingers 31', 32', 33' and 34' substantially parallel to the end portions of the seal. However, the present invention is not limited to this configuration of perforation. In other words, they need not extend substantially across/through the base 22' and/or the fingers 31', 32', 33' and 34' substantially parallel to the end portions of the seal. In this vein. FIGS. 56(*a*) to 56(*d*) show various example perforation configurations according to different embodiments of this invention. First, FIG. 56(*a*) shows perforations 54*a* that slant and/or are angled relative to the end portions of the seal. FIG. 56(*b*) shows substantially triangular (which also may be flipped to "V" shaped) perforations 54*b*. FIG. 56(*c*) shows "X" shaped perforations. The increased number of perforations in close relative proximity to one another further increase the likelihood of a breakaway occurring when one tries to remove the seal 20'. FIG. 56(*d*) shows multi-curved or "squiggle" type perforations 54*d*. Other shapes and/or arrangements such as simple or complex lines, curves, and/or other shapes may be used in connection with embodiments of this invention, and the invention is not limited to any particular configuration. Accordingly, the perforations may be formed according to any predetermined pattern in certain example embodiments. Similarly, and as alluded to above, the perforations may be formed at predetermined spacings relative to one another (e.g., 2-8" apart).

Although the description of the inclusion of perforations is given in connection with a modification to the FIG. 1 example embodiment, it will be appreciated that the perforations may be used in connection with any of the example embodiments described herein.

FIGS. 6-25(*a*) disclose different embodiments of a spring loaded security seal for positioning at the bottom side or underneath of door 6. The purpose of such a security seal underneath the door is to prevent burglars and the like from breaking into a room or dwelling by accessing the door locking mechanisms and the like from underneath the door.

The FIG. 6 security seal 60 may be attached to door 6 at a variety of locations, as dictated by the specific door design. Door engaging portion 62 of security seal 60 may be disposed along and affixed to the interior or inside surface of door 6 as shown in FIG. 7, along the bottom of the door as shown in FIG. 8, or alternatively within a recess in the bottom of a door as shown in FIG. 9.

Door engaging portion 62 of security seal 60 is preferably attached to the inside or Security side of door 6 as shown in FIGS. 7 and 10. Door engaging portion 62 is attached at a location which is inaccessible from the outside. Door engaging portion 62 is attached to door 6 so that security flap 64 is movable from an open door (non-secured) position substantially parallel to and adjacent the bottom of door 6 (see FIG. 7) to a secured or door closed position (e.g., see FIG. 11) wherein security flap 64 is pivoted downward about hinge 70 so as to be close to or actually in contact with the floor or ground thereby securing the dwelling against unwanted entry.

In the door closed position (e.g., FIG. 8 and FIG. 11), the distal end or free edge 65 of flap 64 may contact the floor.

Hinge 70, of course, may be any type of known hinge (e.g., living hinge) and optionally may be located in a recess defined by the door so as to not extend or project outwardly from door 6.

As shown in FIG. 8, when door engaging portion 62 is affixed to the bottom side of door 6, flap 64 is substantially parallel thereto when the door 6 is opened, with flap 64 pivoting downward about hinge 70 when the door is closed. In FIG. 9 when door engaging portion 62 is affixed to the upper side of the recess defined in the underneath side of the door, security flap 64 is, again, substantially parallel to portion 62 when door 6 is in an open position. When door 6 is closed, flap 64 is forced to or permitted to pivot downward about hinge 70 to the door closed position as shown in FIG. 9.

As shown in FIG. 10, the distal end of flap 64 is angled upward at 65 so as to permit the security flap to slide more easily along rugs, hardwood floors, and the like.

Because the security seal of FIGS. 6-11 is spring-biased into its door open position (see FIG. 7), the flap actuating cams shown in FIGS. 12-25(*a*) are required for forcing flap 64 downward into the secured position when door 6 is closed. FIG. 12 illustrates flap actuating cam 90 attached to and protruding from rabbett 12 of the door frame on the interior or secured side of stop 10. FIG. 13 illustrates an alternative embodiment of flap actuating cam 90 non-adjustably affixed to rabbett 12. The positioning of cam 90 in both FIGS. 12 and 13 is such that when door 6 is swung closed, cam engaging surface 68 of flap 64 comes into contact with cam 90 thereby forcing flap 64 downward into contact with the floor placing the security seal in the secured position. When door 6 is opened, flap 64 is biased upward into the FIG. 7 position (door open position) as there is no longer contact with cam 90.

Figure 14:
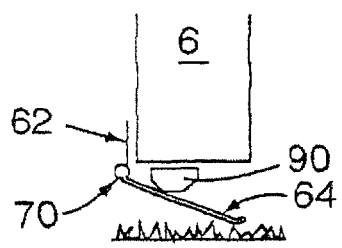
FIG. 14 is a side elevational cross-sectional view of the security seal of FIG. 6 in the door closed position when the actuating cam is in contact with the security flap maintaining it in the secured position.
Figure 15:
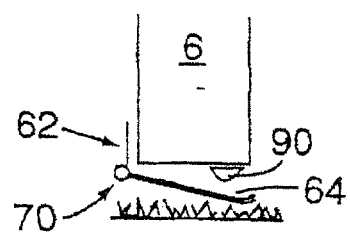
FIG. 15 is a side elevational cross-sectional view illustrating the security seal of FIG. 6 in the door closed position with the cam in an alternative position.
Figure 16:
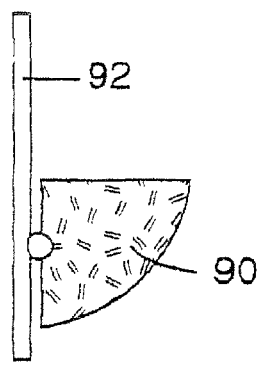
FIG. 16 is an elevational view of an alternative cam configuration.
Figure 17:
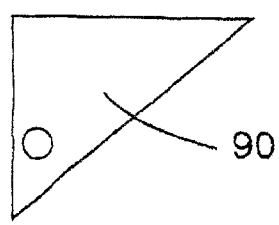
FIG. 17 is an elevational view of yet another alternative cam configuration, both the FIG. 16 and FIG. 17 cams being usable in conjunction with the FIG. 6 spring-biased security seal.

FIG. 14 is a side view of door 6 having security seal 60 attached thereto in the closed position so that flap 64 is contacting or close to contacting the floor or ground. As shown, cam 90 is in contact with flap 64 thereby forcing it against the spring bias force downward into the secured position. FIG. 15 illustrates that both the location of cam 90 on the rabbett and the size of cam 90 are adjustable for the purpose of changing the timing of cam engagement with flap 64 and the distance that flap 64 is forced downward when the door is closed. FIGS. 16-17 illustrates alternative designs for cam 90.

Cam 90 is affixed to door frame 8 and preferably to rabbett 12 on hinge jamb 16, and is aligned to engage cam following surface 68 of security flap 64 such that upon closing the door, the cam following surface contacts the cam and the security flap is forced downward away from the door to contact the floor. Cam 90 functions as a security wedge to dispose and maintain the security seal in the door closed position. As shown in FIGS. 16-17, cam 90 may be formed as an arc of a sphere or circle, a spiral, french curve, etc. While cam 90 is preferably mounted on the hinge jamb, it may alternatively or additionally be mounted on the lock jamb. The specific curve or shape of the contacting surface of cam 90 and the shape of cam following surface 68 on the flap are related and, at least partially, dictate the desired position of cam 90 on the door frame.

Figure 18:
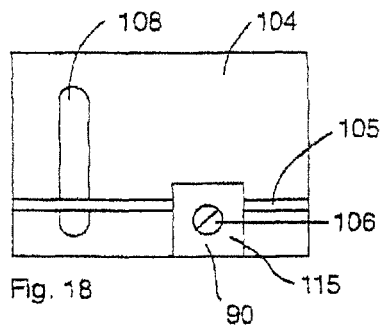
FIGS. 18-19 illustrate still another embodiment of a security seal actuating cam and corresponding bracket to be affixed to the door frame for the purpose of actuating a spring loaded security seal to the secured position.
Figure 19:
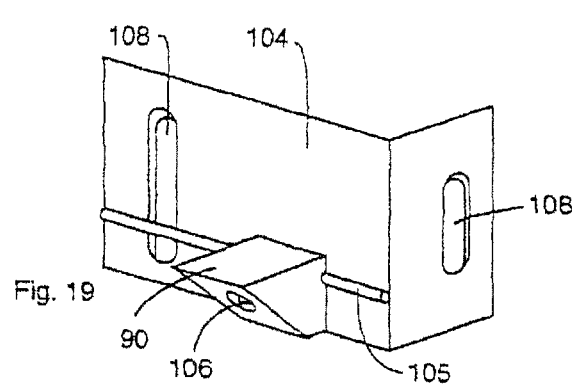

FIGS. 18-24 illustrate different embodiments of flap engaging cam 90 (for use with the spring-biased security seals of this example embodiment) which are preferably affixed to the hinge jamb, but may instead or additionally be affixed to the lock jamb. As shown in FIGS. 18-19, cam 90 is affixed on mounting bracket 104. Pin or projection 105 is formed integrally with or on bracket 104 so that cam 90 may be adjustably positioned along the length of pin 105. Accordingly, in order to move cam 90 from one position to another along pin 105, the user loosens screw 106, slides cam 90 along pin 105 to the new position, and thereafter tightens screw 106 which locks cam 90 to a particular position on bracket 104. Bracket 104 is affixed to the door frame as shown, for example, in FIG. 12. Elongated apertures or holes 108 are provided in bracket 104 so that its vertical position on the door frame may be adjusted. Cam 90 and bracket 104 are preferably affixed to the door frame by way of screws inserted through apertures 108 (e.g., see FIG. 22). Apertures 108 may also be used for allowing an installer of the system to view alignment marks mades on the door frame thereby enabling easier installation.

Figure 20:
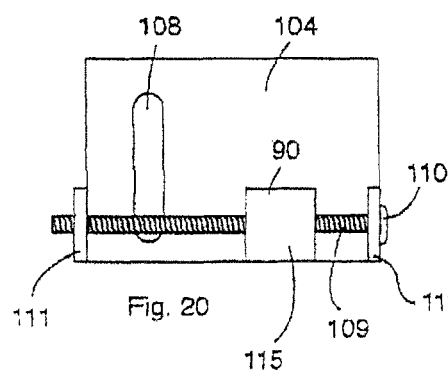
FIGS. 20-21 illustrate a security seal actuating cam and corresponding bracket to be affixed to a door frame similar to that shown in FIGS. 18-19, except that a cam is mounted on a screw thereby enabling lateral adjustment of the cam so that the time at which the flap is actuated during door closing and/or opening may be adjusted.
Figure 21:
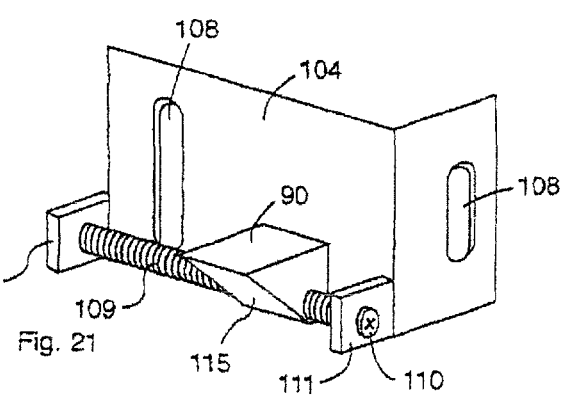

FIGS. 20 and 21 illustrate another embodiment of the cam for actuating flap 64 of the security seal. As shown, cam 90 is attached to screw 109 so that mere turning of the screw by a user at screwhead 110 causes cam 90 to move horizontally along the screw. Screw 109 is affixed to bracket 104 by way of screw mounting members 111, with bracket 104 and the cam being affixed to the door frame as discussed above.

Figure 22:
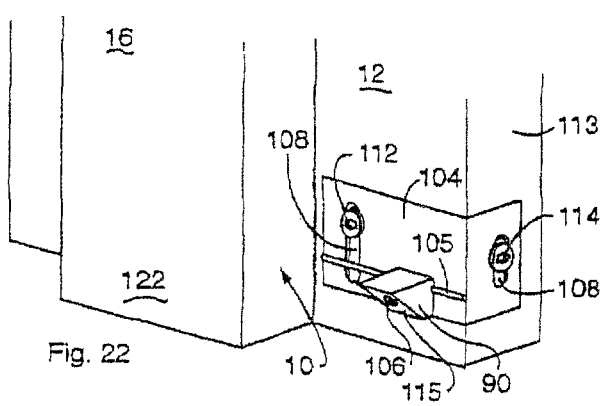
FIG. 22 is a perspective view illustrating the actuating cam and corresponding bracket of FIGS. 18-19 affixed to a door frame.

FIG. 22 is a perspective view illustrating the security seal earn system of FIGS. 18-19 affixed to the door frame. As shown, the main portion of bracket 104 is attached to the front face of rabbett 12 on the interior side of the stop by way of screw 112. Meanwhile, the other portion of bracket 104 which is angled 90 degree backward from the main portion is affixed to inside frame face 113 by way of tamper-proof screw 114. Accordingly, as door 6 with security seal 60 affixed thereto is closed, surface 68 of flap 64 comes into contact with angled surface 115 of cam 90 so that flap 64 is forced downward against the spring bias into the secured position as the door closes.

It is to be pointed out that according to alternative embodiments, cam 90 may be affixed to the security flap so as to contact the door frame when the door closes and causes the flap to pivot downward.

Figure 23:
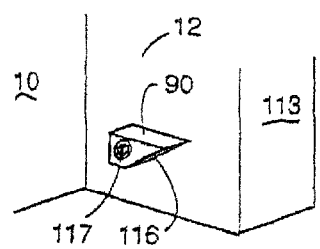
FIG. 23 illustrates yet another embodiment of a security seal actuating cam affixed to a door frame.

FIG. 23 illustrates another embodiment of a security flap actuating cam affixed to rabbett 12 (lock or hinge jamb). As shown in FIG. 23, cam 90 is affixed to the rabbett so that portion 68 of flap 64 comes into contact with surface 116 of the cam as the door is closing thereby forcing flap 64 downward into the secured position. Screw 117 or any other conventional fastener functions to hold cam 90 to rabbett 12 in a secured position.

Figure 24:
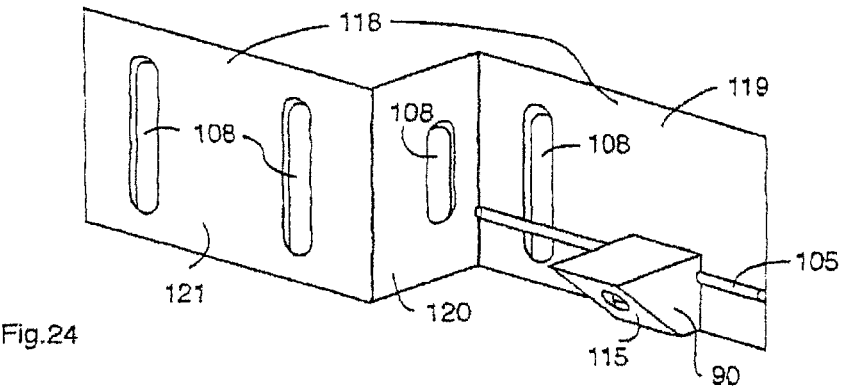
FIG. 24 is a perspective view illustrating a further embodiment of a security seal actuating cam and corresponding bracket, this embodiment differing from the FIGS. 18-19 embodiment in that it includes three surface bracket members angled relative to one another to be mounted in different areas.
Figure 25:
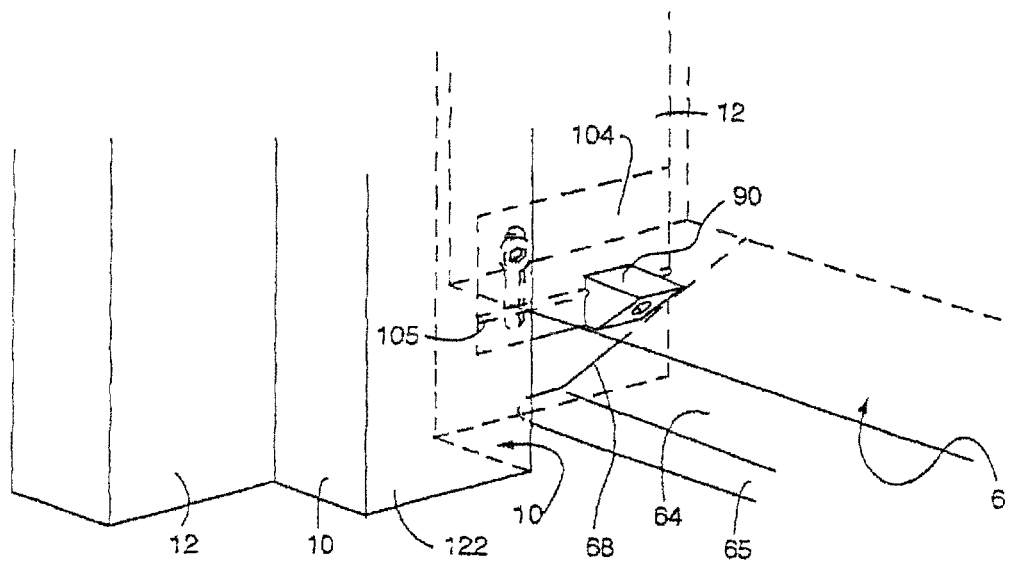
FIG. 25(a) is a perspective view illustrating the actuating cam of FIGS. 18-19 mounted to a door frame, with the cam contacting the security flap in the door closed position.
FIGS. 25(b)-25(c) are perspective views of a door closing with a security flap distal end according to another embodiment of this invention.

FIG. 24 is a perspective view illustrating another embodiment of a security seal cam actuating system in which bracket 118 is provided with three sections angled relative to one another. Section 119 of bracket 118 is affixed directly to rabbett 12, with section 120 being affixed to stop 10 and section 121 being attached to and flush with soffit 122. Again, apertures 108 are provided in bracket 118 so that the system may be affixed to the door frame. The position of cam 90 may be adjusted on portion 119 by way of moving the cam laterally along pin 105 as discussed above with respect to FIGS. 18-19.

FIG. 25(a) is a perspective view illustrating the FIGS. 18-19 cam system affixed to the door frame when door 6 is in the closed position. As shown, security flap 64 is in contact with cam 90 and is therefore forced downward into the secured position against the bias of the spring. Distal end 65 of flap 64 is angled upward with respect to the main portion thereof so as to enable the flap to slide more easily along carpets and the like. As door 6 is opened, cam engaging edge 68 of flap 64 will slide along cam 90 until the portion adjacent distal end 65 is no longer in contact with the cam. Thereafter, flap 64 is spring-biased upward so that it is substantially parallel to the bottom of door 6.

FIGS. 25(b)-25(c) illustrate another embodiment of this invention where the distal end of security flap 64 includes portion 300 angled downward toward the floor and portion 301 angled upward. Portion 300 contacts cam 200 during door 6 opening and closing, while portion 301 is angled upward to enable easy sliding of the flap over rugs and the like. Flap distal end portions 300 and 301 are angled in opposite directions relative to the main body of the flap 64.

FIGS. 26-31 illustrates a security seal system to be positioned adjacent the bottom of door 6, this system differing from the security seal discussed above in that the system of FIGS. 26-31 is gravity-actuated.

Figures 26, 27, 28:
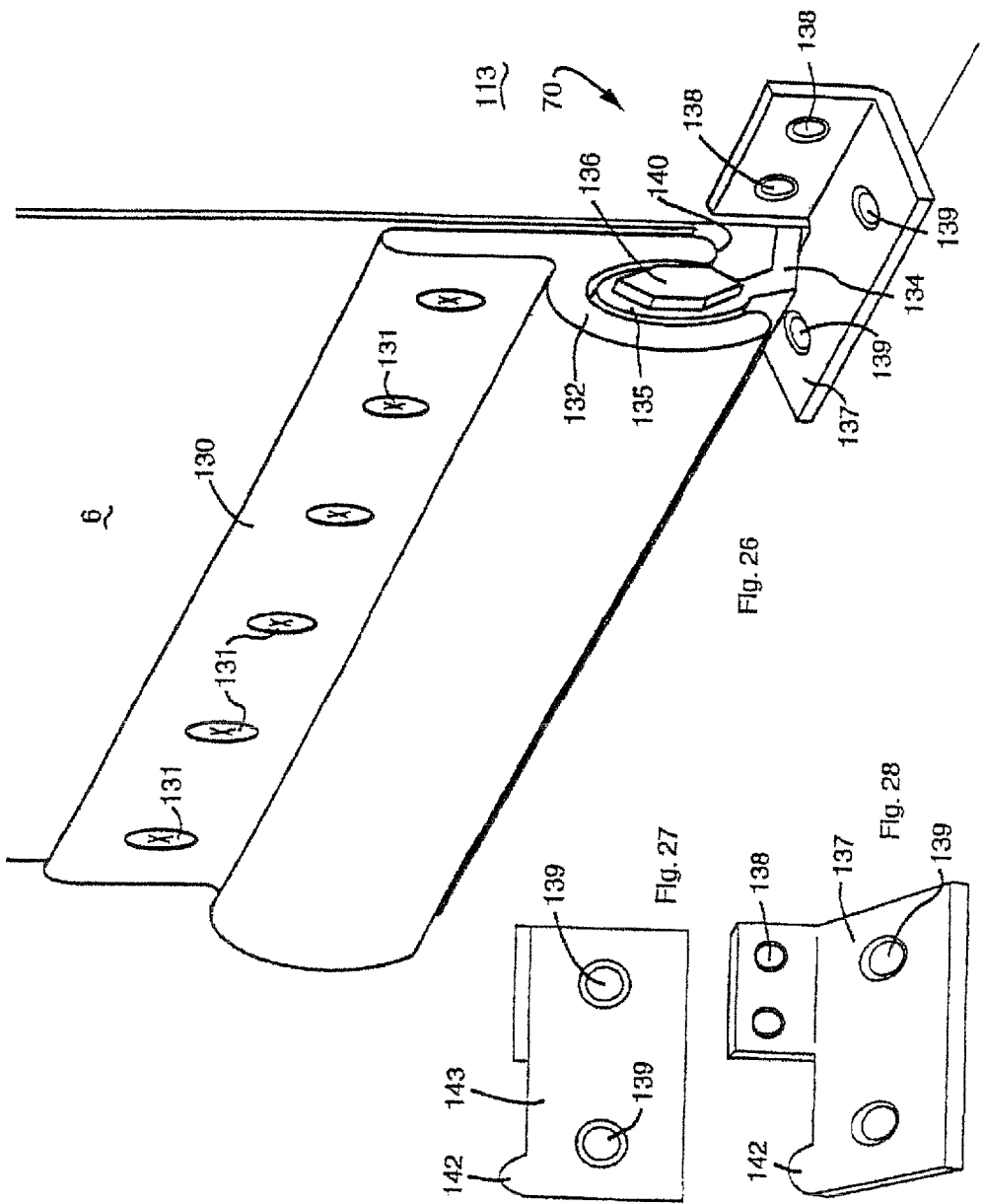
FIG. 26 is a perspective view illustrating a gravity-actuated door security seal attached to a door in the door closed position.
FIGS. 27-28 illustrate the actuating cam to be used in conjunction with the gravity-actuated security seal of FIG. 26.

FIG. 26 is a perspective view illustrating a gravity-actuated security seal system for attachment adjacent the bottom of door 6. As illustrated, door engaging portion 130 is affixed to the interior side of door 6 by way of screws 131 or any other type of conventional fastener. Integrally formed with door engaging portion 130, according to this embodiment, is elongated quasi-circular housing 132 which extends across the interior surface of door 6 between the hinge and lock jambs. Security flap 134, shown in FIG. 26 in the secured door closed position, is pivotally attached within housing 132 (e.g., hinge arrangement). Connected to security flap 134 is elongated core member 135 which is maintained within housing 132 by way of hex fasteners 136 on either end of the housing. Also utilized in this embodiment is flap actuator or cam 137 which functions to raise flap 134 upward from the ground as door 6 is opened. Actuator or cam 137 is affixed to inside frame face 113 and/or the floor by way of fasteners extending through apertures 138 and/or 139, respectively.

A typical operation of the gravity-actuated security seal of FIG. 26 will now be described. As illustrated in FIG. 26, security flap 134 is in the secured or down position so that the distal end of flap 134 is either in contact with the floor or substantially close thereto. For the purpose of this description, it is assumed that actuator 137 is affixed to the inside frame face on the hinge jamb side of the door frame, although it is possible to be affixed to the other side. As door 6 is opened, the lower surface of security flap 134 slides along actuator or cam 137 thereby forcing security flap 134 to pivot upward out of contact of the floor until flap 134 is substantially parallel to the ground. This pivoting of flap 134 is permitted by way of core 135 pivoting within housing 132. Flap 134 is permitted to pivot upward until the flap comes into contact with area 140 of housing 132. The flap is maintained in this non-secure or upward pivoted position while door 6 remains open. When door 6 is closed, the bottom of flap 134 slides along the top of actuator 137 from its distal end toward the end closest core 135 which causes flap 134 to pivot downward away from the door bottom and into the secured position as the door is closed.

FIGS. 27-28 illustrate a different embodiment of an actuator which may be used in conjunction with the FIG. 26 system. FIG. 28 illustrates the actuator 137 shown in FIG. 26, which is affixed to either the floor or the inside frame face 113. Rounded projection portion 142 is the primary cam surface of the actuator which is contacted by flap 134 during the opening and closing of door 6. FIG. 27 is a top view of the FIG. 26 and FIG. 28 actuator.

Figure 29:
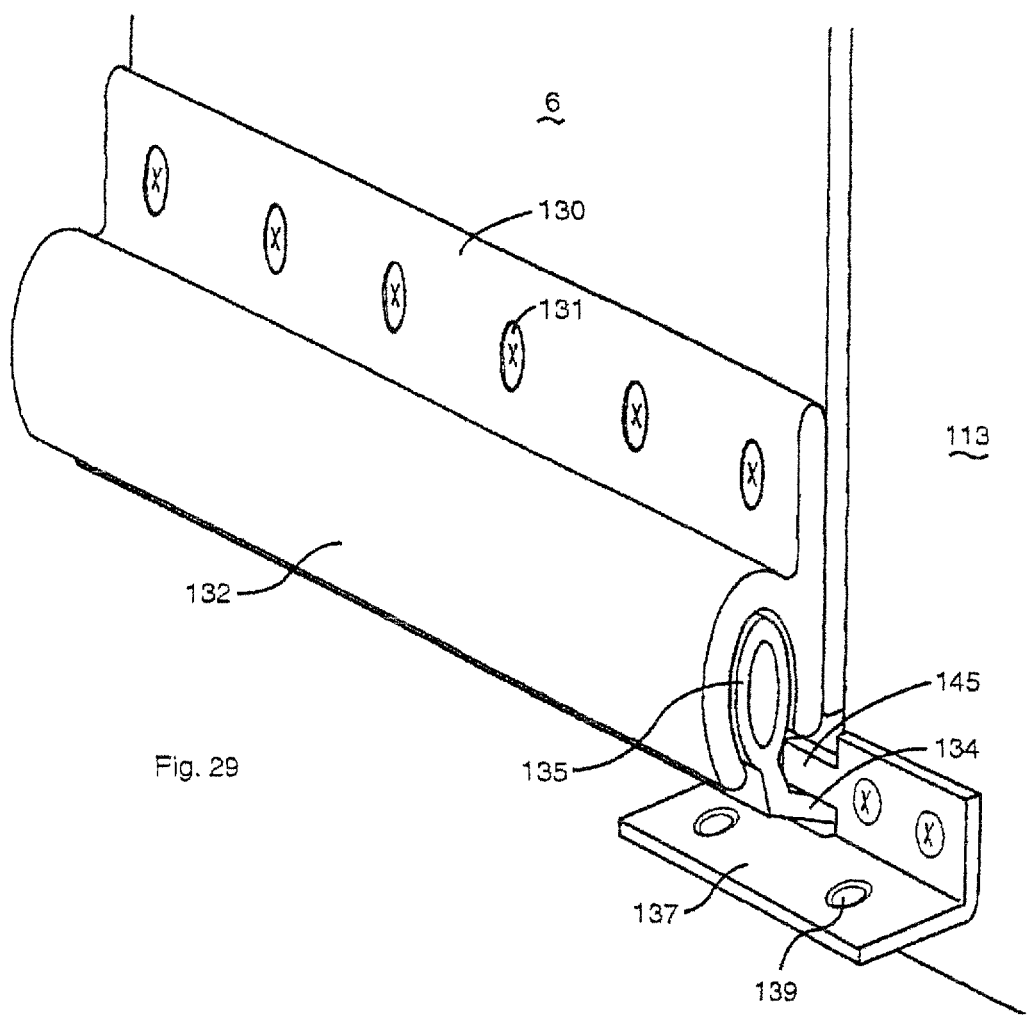
FIG. 29 is a perspective view illustrating another embodiment of a gravity-actuated door security seal, this embodiment differing from the FIG. 26 embodiment in that a flap locking device is integrally formed with the actuator in order to maintain the flap in the down position when the door is closed.

FIG. 29 is a perspective view of the gravity-actuated security seal system of FIG. 26 except that flap 134 locking member 145 is also provided. According to the FIG. 29 embodiment, locking member 145 includes a projection which extends into the doorway from the portion of actuator 137 affixed directly to inside frame face 113. This projection 145 functions to maintain or lock security flap 134 in the secured position when door 6 is closed. The size and positioning of member 145 are such that flap 134 is still permitted to pivot upward out of the secured position when door 6 is opened (but not when the door is closed) as flap 134 slides along portion 142 of actuator 137.

FIG. 30 is a perspective view illustrating the gravity-actuated security seal of FIG. 26 except that actuator 137 is replaced with adjustable actuator 147 which is affixed to the floor by way of fastener 148. In the FIG. 30 embodiment, flap 134 remains pivoted downward so as to be in contact with the floor or close thereto, when door 6 is in the closed position. However, when the door is opened, the underneath side of flap 134 slides along the top surface of actuator 147 resulting in flap 134 being pivoted upward about the core 135 axis into a non-secure position substantially parallel to the bottom of the door. The bottom side of flap 134 remains in contact with the top of actuator 147 while door 6 is open, thereby maintaining flap 134 in a non-secured position out of contact with the ground or floor. As door 6 is closed, gravity causes flap 134 to pivot downward toward the floor as the flap slides along the top of actuator 147 from the flap's distal end toward the end closest to core 135.

FIG. 31 is a perspective view of another adjustable actuator 149 which may be used in place of actuator 147. Actuator 149 is square in shape and includes bottom section 150 and top section 151. Bottom section 150 is affixed to the floor, while the vertical position of portion 151 may be adjusted relative to that of section 150 by way of screws 152. By turning screws 152, a user may cause section 151 to move down or up depending on the screw turn direction so that the extent to which security flap 134 pivots in both directions is adjustable. In a manner similar to actuator 149, top portion 153 of actuator 147 is vertically adjustable with respect to bottom portion 154 through turning of screw 148 or alternatively by rotating member 153 about a fixed screw 148. Optionally, element 151 may be adjustably attached to actuator 137 (see FIG. 28) so that screws 152 fit in apertures 139.

FIGS. 32-33 illustrate an embodiment of this invention including security flap locking member 160 which may be used with any of the above-discussed security seal embodiments of this invention. Flap locking member 160 is affixed to interior frame face 113 by way of screws or fasteners 161. Locking member 160 extends beyond face 113 so that it is located directly above flap 134 when the flap is in the secured or closed door position as shown in FIG. 32. In such a manner, member 160 prevents intruders from unlawfully entering the secured location by keeping flap 134 maintained in its down or door-closed position when door 6 is closed and preventing it from being pivoted upward.

Figure 34:
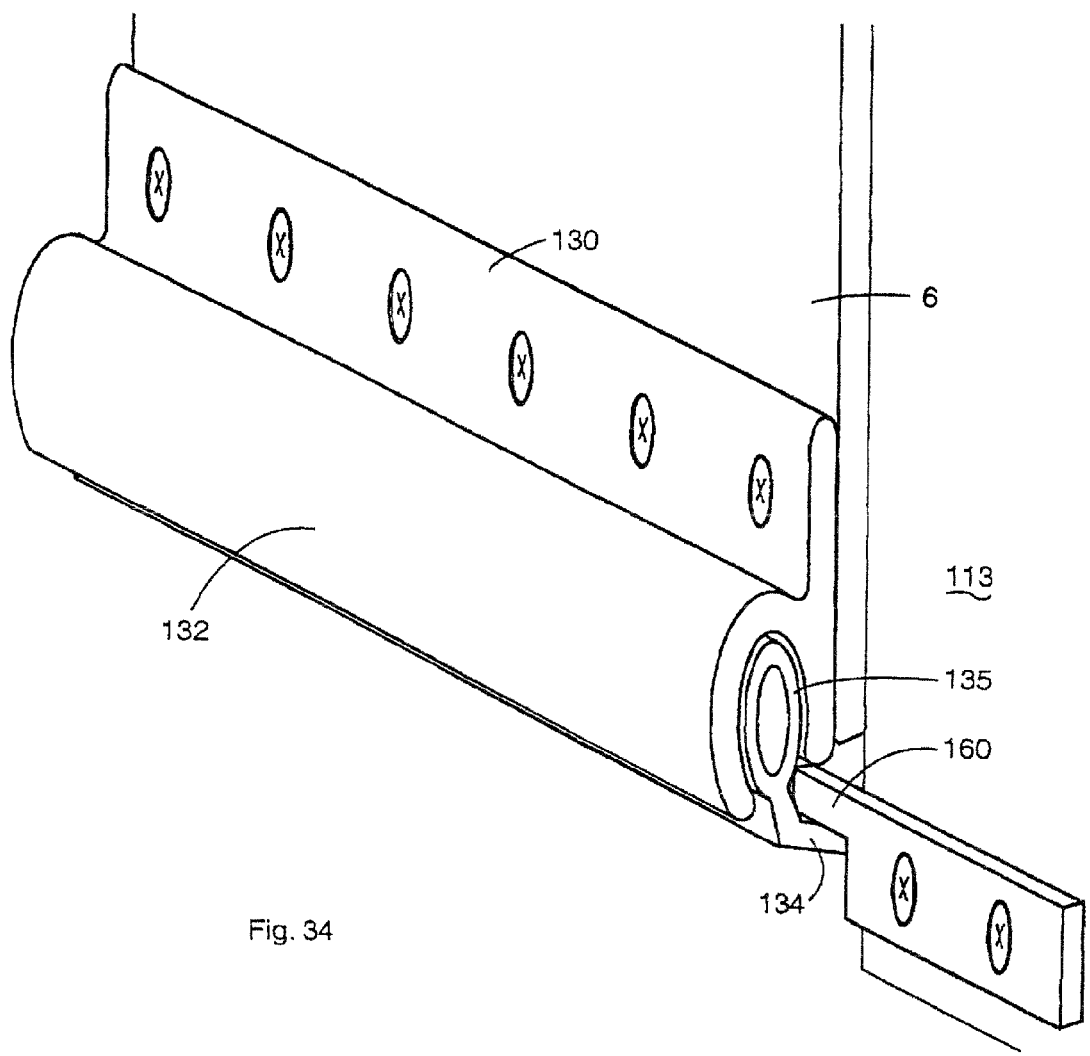
FIG. 34 is a perspective view illustrating the flap locking member of FIG. 32 mounted on door frame for use in conjunction with a different type of security flap design.

FIG. 33 is a top view of the FIG. 32 embodiment, illustrating flap locking member 160 affixed to interior face 113 adjacent housing 132 and flap 134, when door 6 is in the closed position. FIG. 34 is an enlarged perspective view illustrating the FIGS. 32-34 embodiment with locking member 160 keeping flap 134 from being raised when door 6 is in the closed position.

Optionally, the bottom surface of 160 may be angled instead of parallel to the floor to enable vertical and horizontal pinning point adjustment.

Figure 35:
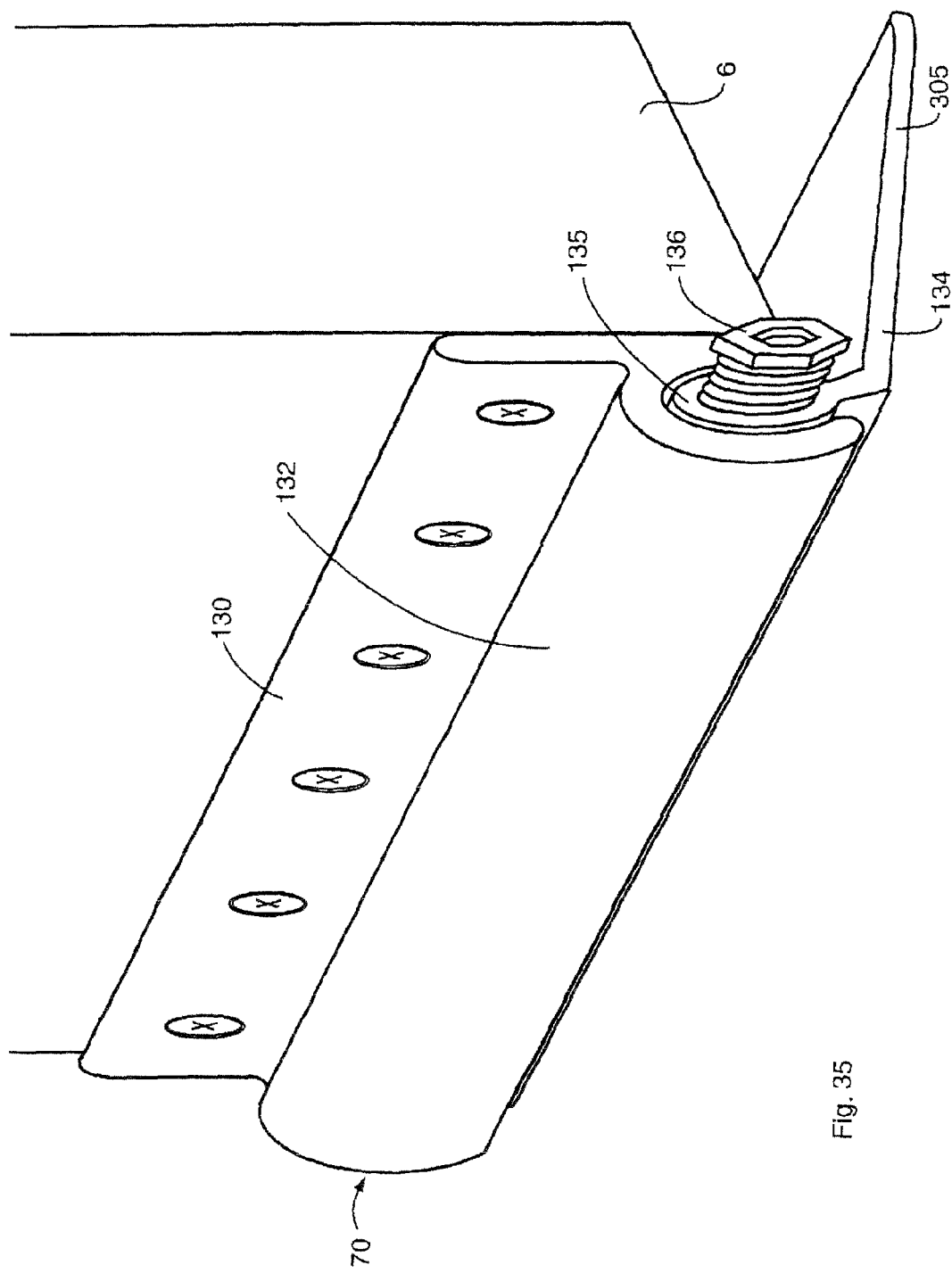
FIG. 35 is a perspective view illustrating how the flap core or rod may be held in position in the housing by threading a hex head screw into opposing ends.

FIG. 35 is a perspective view illustrating that core 135 of the gravity-actuated security seal may be pivotally attached within elongated housing 132 to make up the hinge by way of hex screw fasteners 136 on either end of the core.

Figure 36:
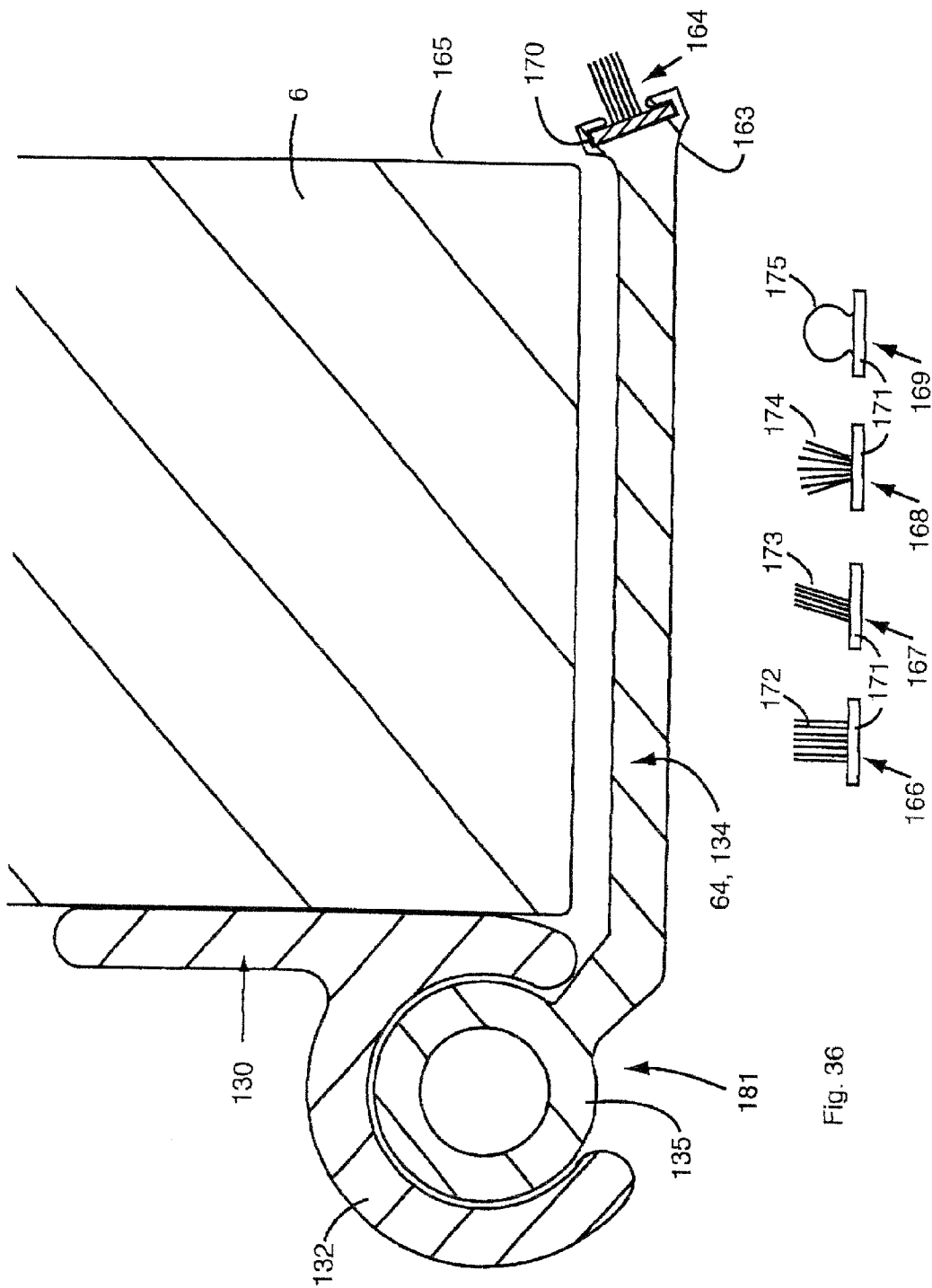
FIG. 36 is a side elevational cross-sectional view of a security seal according to any of the above embodiments wherein an insert element may be inserted into the distal end of the security flap via a keyway defined therein for the purpose of additional sealing.

FIG. 36 is a side cross-sectional view of either a gravity-actuated or spring bias security seal system affixed adjacent the bottom of door 6. As shown in this embodiment, security flap 64, 134 includes distal end portion 163 having an insert 164 located therein for the purpose of creating an improved seal beneath the outside 165 of door 6. A plurality of different inserts 166-169 are illustrated, each of which may be slid into elongated keyway 170 formed in the distal end of the security flap. Both keyway 170 and insert 164 are elongated so that they extend along the entire length of flap 64, 134 between the door frame along the bottom of the door. Turning to the possible inserts, 164, insert 166 includes base member 171 on which a plurality of flexible bristles 172 are mounted. Bristles 172 extend directly upward from base 171 so that they are substantially perpendicular with respect thereto. Insert 167 is an insert which includes a plurality of bristles 173 which are angled with respect to base 171, the angle being between 0 and 90 degrees. Insert 168 includes base 171 on which are mounted a plurality of bristles 174 which extend in different directions relative to the base. Some bristles 174 extend perpendicular from base 171, while others of insert 168 are angled relative to the perpendicular direction. Finally, insert 169 includes elongated oval projection 175 extending from base 171 for the purpose of enhancing the seal between the floor and the bottom of door 6 on its exterior 165 side.

Optionally, any of the FIG. 36 inserts may instead be attached to the side edge 305 of the flap 64, 134 so as to further seal between the flap and door frame. In such embodiments, the bristles would extend toward and contact the door frame. Also, the attachments or inserts could be pivotally attached to the flap by way of a male or female groove defined in the flap edge or end.

FIG. 37 is a side cross-sectional view of either a gravity-actuated or spring-biased security seal system, with the hinge or pivot system 70, 180 being different than in the previously illustrated embodiments. In the previous embodiments, housing 132, which was integrally formed with portion 130, surrounded core 135 which was integrally formed with the security flap, with the core being pivotally mounted within the housing to form the hinge. For example, as shown in FIG. 36, housing 132 has opening 181 defined therein so that the housing is not a complete circle. Opening 181 allows the security flap to extend from the core mounted within the housing.

In contrast, FIG. 37 illustrates an embodiment wherein core 184 is integrally formed with door engaging portion 130, while the exterior housing 185 encompassing the core is integrally formed with security flap 64, 134. As housing 185 is rotatably or pivotally attached around core 184, this permits the security flap 64, 134 to pivot or hinge downward to the secured position when door 6 is closed.

Optionally, biased finger 315 may be affixed to the distal end of the flap so as to seal between the flap and the door bottom finger 315 is biased upward toward the bottom of door 6.

Figure 39:
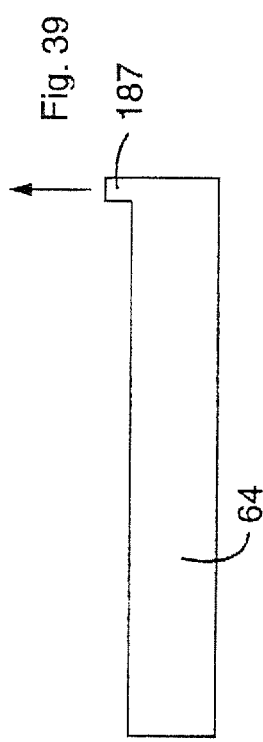
FIG. 39 is a top elevational view of the flap and its projection element of FIG. 38.
Figure 38:
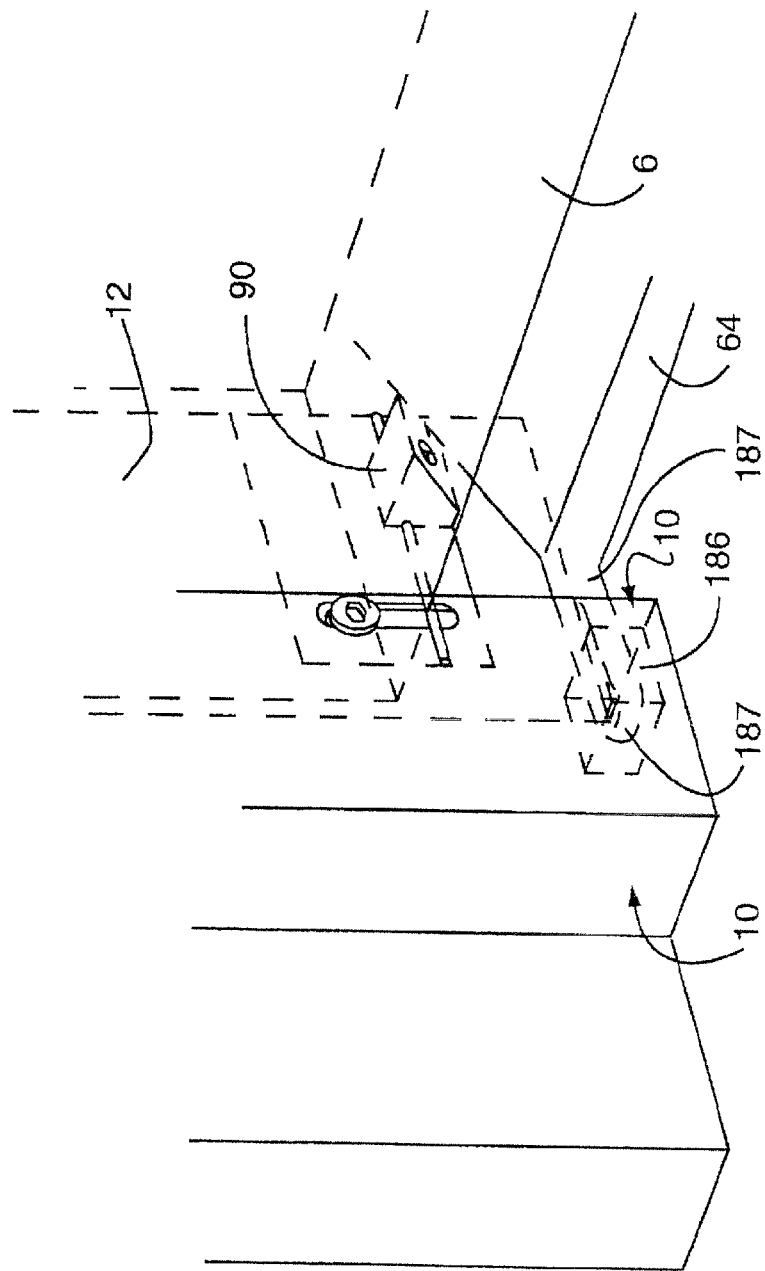
FIG. 38 is a perspective view illustrating a spring loaded security seal according to still another embodiment of this invention wherein a recess or cavity is provided in the stop with a projection from the flap extending therein for the purpose of maintaining the flap in the downward position when the door is closed.

FIGS. 38-41 illustrate alternative embodiments for locking the security flap in the down or secured position when the door is closed. As shown in FIG. 38, recess or cavity 186 is formed in stop 10 on the interior side closest actuator 90. The purpose of cavity or recess 186 is to receive elongated projection 187 which extends outwardly from the end of security flap 64. Projection 187 extends into cavity or recess 186 only when door 6 is in the closed position thereby enabling the recess 186 to prevent flap 64 from being raised when the door is closed. FIG. 39 is a top view of the FIG. 38 security flap 64 illustrating projection 187 extending from an end thereof to be placed adjacent the door frame.

FIGS. 40-41 illustrate an embodiment similar to that of FIGS. 38-39 except that the recess 190 in FIGS. 40-41 is not completely enclosed as in FIGS. 38-39. Instead, recess 190 of FIGS. 40-41 is defined under stop 10 and is open at both the interior side of stop 10 and the soffit side 191 of the stop.

Recess 190 functions to receive security flap 64 when door 6 is in the closed position. Unlike the FIGS. 38-39 embodiment, security flap 64 of the FIGS. 40-41 embodiment extends far enough so that its distal end 193 extends into recess 190 when door 6 is closed (e.g., no projection is needed). The FIGS. 40-41 embodiment may be used in conjunction with the spring-loaded security flap as shown or alternatively in conjunction with a gravity-actuated security seal system.

An alternative to the FIGS. 40-41 embodiment would be to affix an elongated member having a lip to the floor across the entire doorway in order to accept end 193 of the flap therein so as to retain the flap in the secure position while the door is closed.

Figure 42:
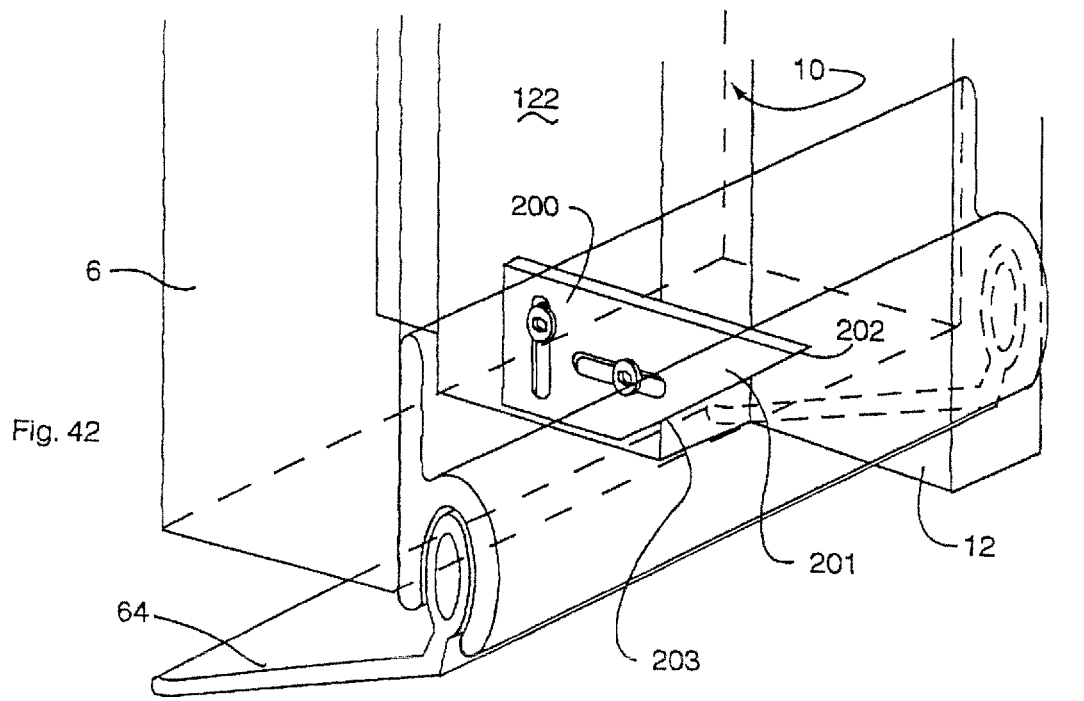
FIG. 42 is a perspective view illustrating a spring-actuated security flap according to another embodiment of this invention wherein the actuating cam is mounted on the soffit of the door frame.
Figure 43:
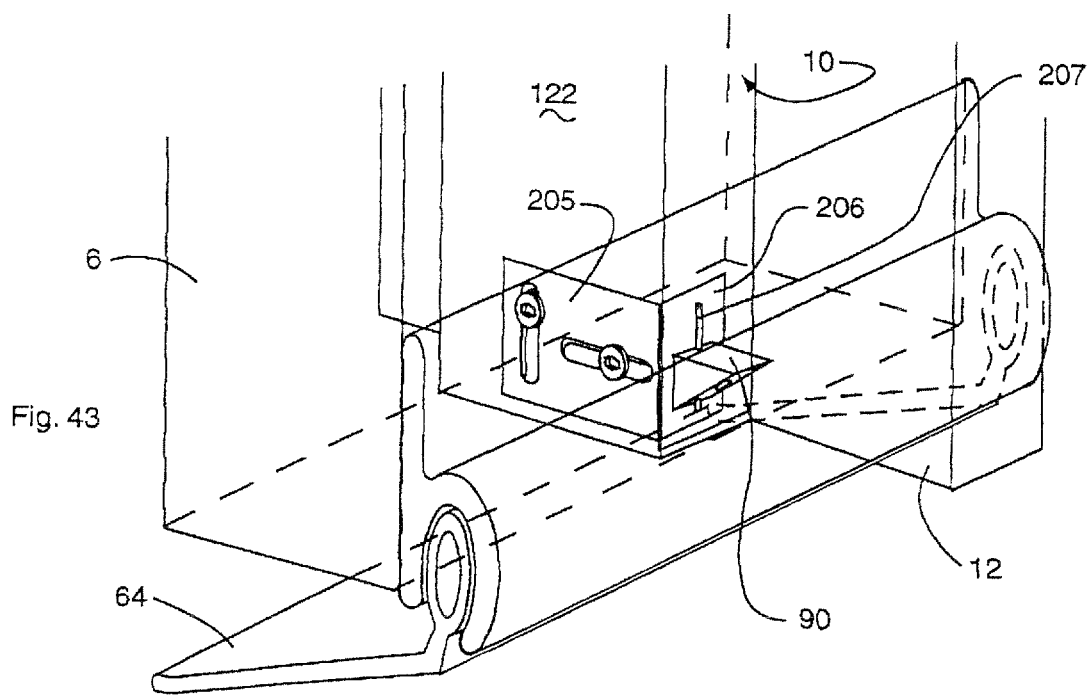
FIG. 43 is a perspective view illustrating a spring-actuated security seal system according to still another embodiment of this invention, wherein the actuating cam is mounted on the stop of the door frame.

FIGS. 42-43 illustrate additional embodiments of this invention wherein for a spring-biased security seal system, the actuating cam extends from interior stop 10 so that it projects itself substantially parallel to the surface of rabbett 12. As shown in FIG. 42, cam 200 is made up of a rigid plate member affixed to soffit 122 with angled cam portion 201 extending beyond the soffit so as to engage the distal end of security flap 64 when door 6 is being closed. When the distal end of flap 64 meets the upper portion 202 of cam projection 201, the distal end of the flap begins sliding down toward bottom portion 203 of the cam projection thereby causing the security flap to pivot downward into the secured or door closed position. Cam projection 201 also functions to maintain flap 64 in the downward pivoted direction while door 6 is closed.

In the FIG. 43 embodiment, cam 90 is affixed to and protrudes from stop 10 on the interior side of the doorway. Cam 90 is affixed to stop 10 and soffit 122 by way of plate or bracket 205 which includes two angled portions at right angles to one another. Portion 206 of bracket 205 include a pin or the like disposed thereon so that the vertical position of cam 90 is adjustable up and down pin 207.

FIG. 44 is a perspective view of another embodiment of this invention including a security flap locking member affixed to the door frame for the purpose of maintaining the security flap in the secured or downward pivoted position when door 6 is closed. As illustrated, planar projection member 210 is affixed to and extends axially outward from core 135 and hex screw 136. When door 6 is in the closed position as shown in FIG. 44, locking member 212 affixed to the door frame by way of screws 213 maintains projection 210 in a particular orientation thereby preventing security flap 134 from being pivoted upward while the door is closed. For this purpose, blocking member 212 includes a pair of spaced planar members 214 between which projection 210 is maintained when the door is closed. Locking member 212 is preferably affixed to the hinge jamb of the door frame.

When door 6 in the FIG. 44 embodiment is opened, projection or wedge 210 pivots about the core 135 axis in direction 215 as illustrated in FIG. 45 so that the projection slides out of locking member 212 as the door opens. When door 6 is closed, projection 210 pivots in direction 216 and slides downward into the space defined between members 214. Accordingly, projection 210 is cause to pivot about the core axis thereby slipping out of locking member 212 when 1) door 6 is opened and 2) security flap 134 pivots upward. Projection 210 cannot be caused to pivot in direction 215 and slip out of the locking member when the door is closed.

FIGS. 46-47 illustrate alternative embodiments for security flaps 64, 134 to be used in either the spring-biased or gravity-actuated security seal systems discussed above. As illustrated, each security flap in FIGS. 46-47 includes an angled distal end 65 as well as at least one aperture defined in the main elongated body of the security flap. In the FIG. 46 embodiment, elongated aperture 220 is provided in the main body of the security flap so that the flap may function, for example, as a mail slot through which mail may be inserted into a dwelling. Alternatively, instead of aperture 220 in the flap, a cut-away portion of similar size could be formed in the distal end 65 of the flap for the same purpose. In the FIG. 47 embodiment, a plurality of circular apertures 222 are provided in the main body of the security flap for the purpose of permitting ventilation and/or air circulation to and from the dwelling under door 6. The provision of the ventilation allowed by the FIGS. 46-47 embodiments permits the security flaps to close more easily.

Figure 50:
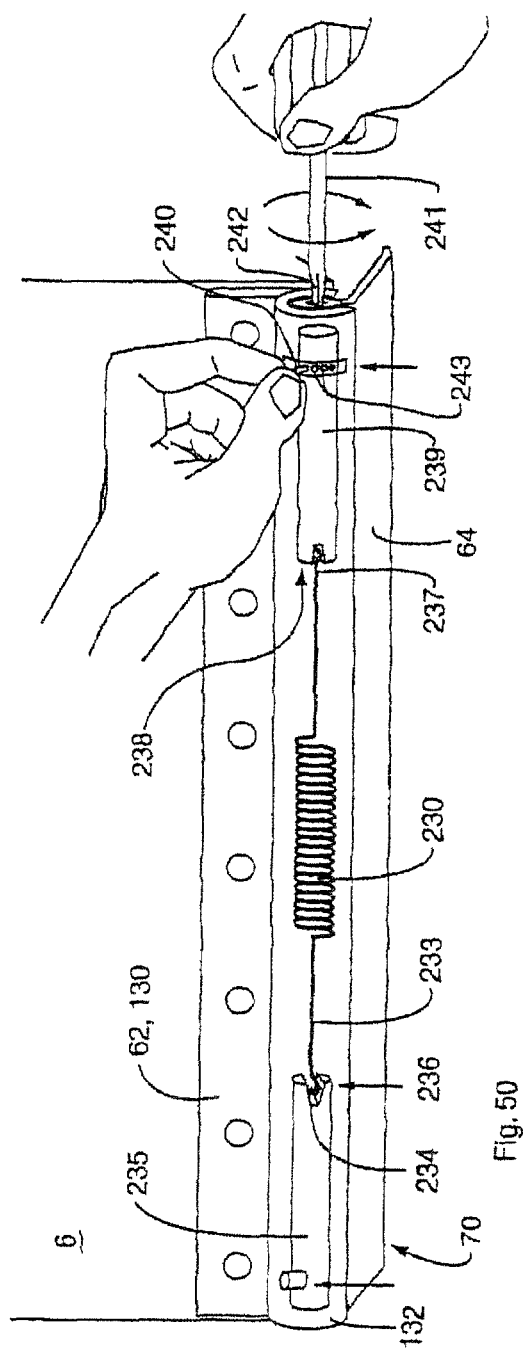
FIGS. 50-51 are perspective views illustrating a spring system for use in any of the spring-actuated security seals discussed above according to different embodiments of this invention.

FIG. 50 is a perspective view illustrating a particular spring-biased security seal system according to an embodiment of this invention. As illustrated, the coil spring 230 is provided inside of elongated housing 132 within hinge 70 of the security seal system. Spring 230 functions to biased security flap upward into the non-secured position (e.g., substantially parallel to the floor) when the security flap is not in contact with cam 90 or the like. Tension on spring 230 in the FIG. 50 embodiment is provided by securing end 233 of spring 230 within receiving slot 234 of elongated member 235 which is affixed within housing 132. This is generally illustrated at 236. While end 233 of the spring is affixed within slot 234 in a non-rotatable manner, end 237 of spring 230 is secured within slot 238 of elongated member 239. Spring 230 is tensioned by rotating elongated member 239 with the spring secured in slot 238 thereof and, while tension is applied, affixing member 239 relative to housing 132 by placing pin 240 through an aperture in the housing into member 239. As illustrated, a user may rotate member 239 and spring end 237 by using screw driver 241 to turn screw 242 which is affixed to member 239. The direction that 241 is turned determines whether the spring is tensioned up or down. In order to permit member 239 to be affixed in different rotated positions within housing 132, a plurality of apertures 243 are provided in the exterior of housing 132 with corresponding apertures being provided in member 239 so that a pin 240 inserted into an aperture 243 and then into a corresponding aperture in member 239 secures and affixes the position of member 239 relative to housing 132 thereby maintaining tension on spring 230. This allows spring 230 to bias security flap 64 upward into the non-secured position substantially parallel to the bottom of door 6.

Figure 51:
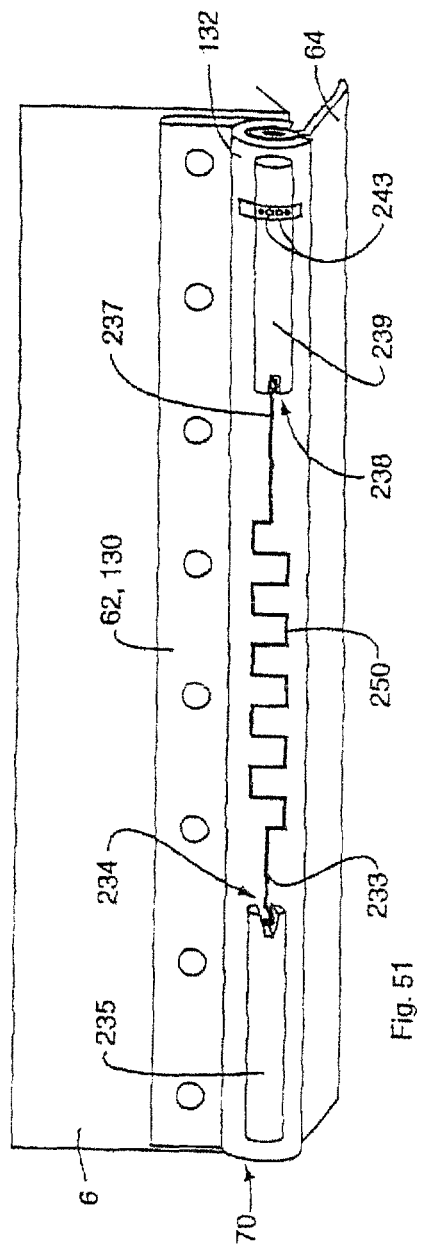

FIG. 51 illustrates a spring-biased security seal system according to an embodiment of this invention similar to that discussed above with respect to the FIG. 50 embodiment. The difference between the FIG. 50 embodiment and the FIG. 51 embodiment, is that the spring 250 in the FIG. 51 embodiment differs in design from spring 230 in the FIG. 50 embodiment. As illustrated in FIG. 51, spring 250 has rectangular coil members while spring 230 has circular coil members. Otherwise, the two embodiments function in a similar manner.

It is also to be pointed out that the spring embodiments of FIGS. 50-51 may be used in conjunction with gravity actuated security flaps so as to tension the flap downward thereby overcoming potential resistance.

Figure 52:
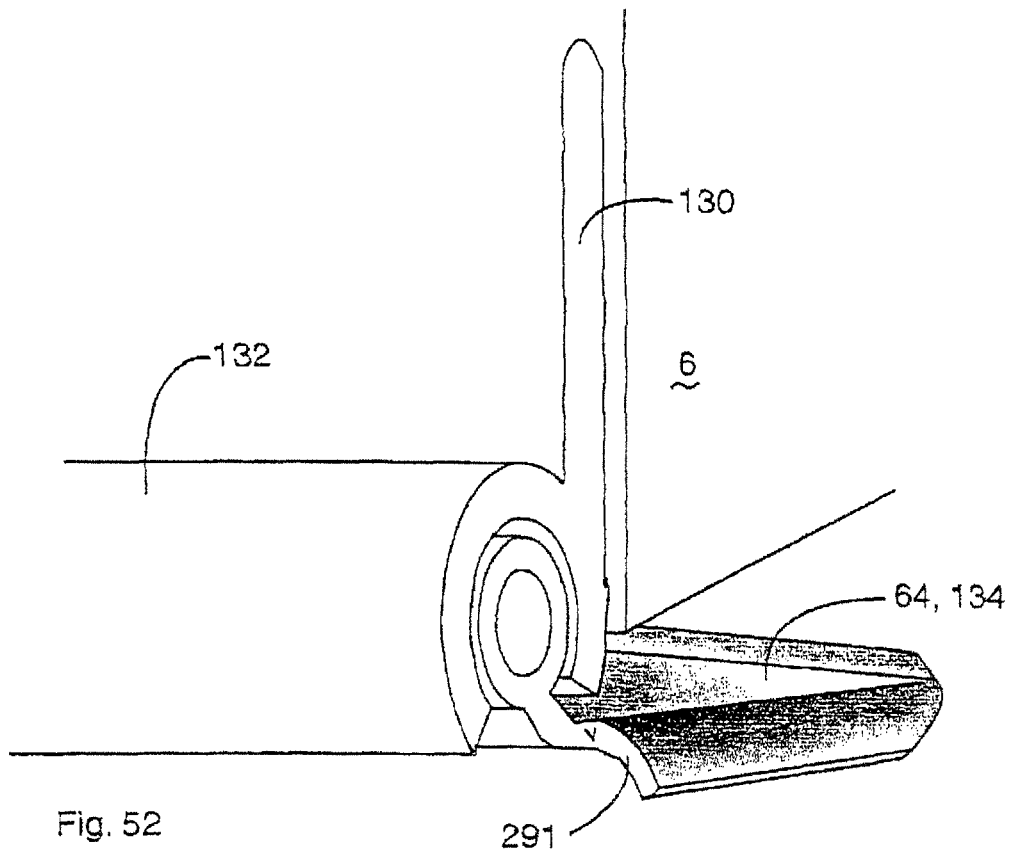
FIG. 52 is a perspective view illustrating the edge of the security flap angled downward adjacent the cam.
Figure 53:
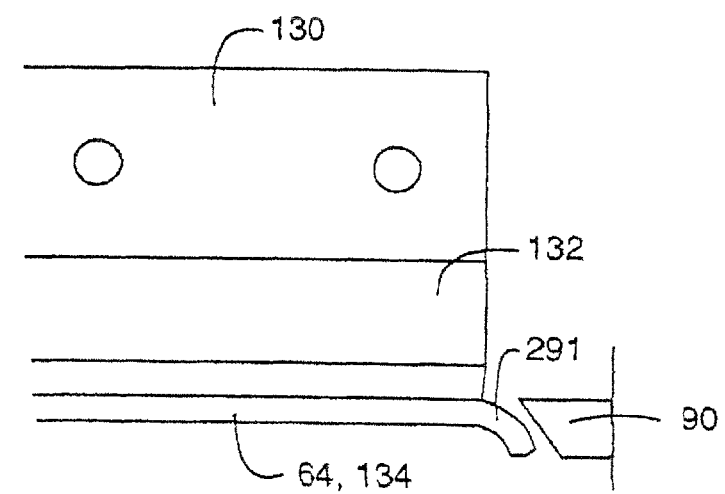
FIG. 53 is a side view illustrating the FIG. 52 security flap as viewed from inside of the dwelling, this Figure illustrating the edge of the flap closest the cam being angled downward.

As illustrated in FIGS. 52-53, the edge of security flaps 64, 134 closest to the hinge door frame is angled downward at 291 where the flap contacts actuator or cam 90. When door 6 closes, angle surface or edge 291 of the security flap comes into contact with cam 90 as discussed above thereby causing the flap to pivot downward into the secured position. The angling of the edge of the flap as shown in FIGS. 52-53 permits the flap to slide more easily at 291 along the actuating surface of cam 90.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A multi-finger seal for sealing an edge of a door, the multi-finger seal comprising:
    a base;
    a plurality of flexible sealing fingers extending outwardly from said base; and
    a plurality of perforations defined in said base so that the multi-finger seal breaks into multiple pieces should removal of the multi-finger seal from the door frame be attempted,
    wherein the perforations are structured so as to cause the seal to break away and into pieces at the application of 50% less force than that which would otherwise be required to cause the seal to break away and into pieces;
    wherein the perforations are located at spaced intervals along substantially an entire longitudinal length of the multi-finger seal.

2. The seal of claim 1, further comprising perforations defined in said flexible sealing fingers.

3. The seal of claim 1, wherein the seal comprises three of the flexible sealing fingers.

4. The seal of claim 1, wherein the perforations comprise a series of holes or slits.

5. The seal of claim 1, further comprising perforations defined in said flexible sealing fingers, and wherein said perforations defined in said flexible sealing fingers extend in a direction away from said base, and wherein said direction in which said perforations in said flexible sealing fingers extend is perpendicular to a lengthwise direction of said sealing fingers.

6. A method of removing at least part of a multi-finger seal for sealing an edge of a door, the method comprising:
    having a multi-finger seal comprising: a base; a plurality of flexible sealing fingers extending outwardly from said base; and a plurality of perforations defined in said base, wherein the perforations are located at spaced intervals along substantially an entire longitudinal length of the multi-finger seal;
    attempting to remove the multi-finger seal from a door frame so that the multi-finger seal breaks into multiple pieces when removal of the multi-finger seal from the door frame is attempted, wherein the perforations are structured so as to cause the seal to break away and into pieces at the application of 50% less force than that which would otherwise be required to cause the seal to break away and into pieces.

7. A multi-finger seal for sealing an edge of a door, the multi-finger seal comprising:
    a base;
    a plurality of flexible sealing fingers extending outwardly from said base; and
    means defined in the base for allowing the multi-finger seal to break into multiple pieces when removal of the multi-finger seal from the door frame is attempted, wherein said means comprise perforations or slits, and said means are structured so as to cause the seal to break away and into pieces at the application of 50% less force than that which would otherwise be required to cause the seal to break away and into pieces;
    wherein the perforations are located at spaced intervals along substantially an entire longitudinal length of the multi-finger seal.

* * * * *